United States Patent [19]

Lorenz et al.

[11] Patent Number: 5,691,985
[45] Date of Patent: Nov. 25, 1997

[54] SYSTEM AND METHOD FOR INCREASING THROUGHPUT OF INTER-NETWORK GATEWAYS USING A HARDWARE ASSIST ENGINE

[75] Inventors: Diana Lynne Lorenz, Naperville, Ill.; Robert Francis Shaw, Clinton, N.J.; Ronald Anthony Spanke, Wheaton, Ill.

[73] Assignee: Lucent Technologies Inc., Murray Hill, N.J.

[21] Appl. No.: 426,425

[22] Filed: Apr. 19, 1995

[51] Int. Cl.6 ............................ H04L 12/28; H04L 12/56
[52] U.S. Cl. .................... 370/401; 370/402; 370/404; 370/902; 364/942.08
[58] Field of Search .................. 370/85.13, 60, 370/85.1, 85.4, 60.1, 18, 94.1, 61, 85.11, 67, 85.14, 85.2, 401, 389, 489, 450, 395, 342, 335, 404, 352, 473, 428, 409, 372, 397, 362, 390, 412, 429, 392, 229, 402; 379/59, 60; 455/33.1, 33.2; 395/200.03, 200.06; 340/825.52; 364/942.08

[56] References Cited

U.S. PATENT DOCUMENTS

| | | | |
|---|---|---|---|
| 3,710,026 | 1/1973 | Graham et al. | 370/405 |
| 4,550,402 | 10/1985 | Gable et al. | 370/401 |
| 5,079,765 | 1/1992 | Nakamura | 370/401 |
| 5,218,602 | 6/1993 | Grant et al. | 370/401 |
| 5,363,369 | 11/1994 | Hemmady et al. | 370/392 |
| 5,473,604 | 12/1995 | Lorenz et al. | 370/229 |
| 5,490,252 | 2/1996 | Macera et al. | 370/402 |

Primary Examiner—Wellington Chin
Assistant Examiner—Melissa Kay Carman
Attorney, Agent, or Firm—Michael B. Johannesen

[57] ABSTRACT

A high bandwidth gateway comprises a source of packet traffic wherein received packets are stored in a buffer, a destination interface circuit for the packets, a microprocessor and a bus that interconnects the components. The microprocessor, which in the prior art controls data transfers, periodically gives up control to a hardware assist engine. The hardware assist engine detects the presence of packets in the source buffer and causes the source buffer to output one or more packets to the destination directly, thus by-passing the microprocessor completely. By this system, bandwidth is improved by the source and the destination working together directly, without having the overhead associated with microprocessor-based or initiated data transfers.

24 Claims, 14 Drawing Sheets

SYSTEM AND METHOD FOR INCREASING THROUGHPUT OF INTER-NETWORK GATEWAYS USING A HARDWARE ASSIST ENGINE

TECHNICAL FIELD

This invention relates to the field of packet switching networks, and, more specifically, to the area of improving the speed at which gateways that connect such packet networks transfer data from one network to another.

BACKGROUND OF THE INVENTION

Packet switching networks are being used in more and more applications to provide communications among distributed processors, wherein the sum total of the processors of the networks can provide more processing power than any one large processor. Increasingly, these processing networks communicate with other processing networks for many purposes, including further distributing the processing load. Such inter-network communication is provided by a "gateway" in each network whose job it is to send and receive messages over a communications medium connecting it to a gateway on another network, and to perform any translation of protocol necessary for transmission on the gateway's network (referred to as the "home" network).

Today's packet switching networks are continually increasing in network speed as new technology becomes available. However, gateways generally have a throughput bandwidth (i.e., the speed at which the gateway can perform the protocol and/or data format changes) less than the speed of its home network. As a result, if there are many messages going from the network to the gateway, the gateway becomes overloaded.

In the prior art, the problem of gateway throughput capacity is usually addressed by providing the gateway with a very powerful processor. Gateways with powerful processors are expensive, and even today's most powerful processors cannot keep up with the throughput capacity required on many of today's network gateways.

FIG. 1 illustrates an example of packetized voice transmission which requires such high throughput capacity. FIG. 1 is a block diagram of a code division multiple access (CDMA) wireless telephone switching system covering a wide geographical area. A CDMA system transmits/receives voice or data at the relatively slow rate of approximately 8 Kbps between a mobile unit 54 and a cell site such as 39 over a spread spectrum signal. A transceiver at the cell site sends/receives the spread spectrum signal and translates the content of the signal into packets. A speech processor (SP), such as speech processor 57, then translates the packets into a digital 64 Kbps pulse code modulated (PCM) stream, as used in standard digital switching. CDMA cellular communication is more fully described in "The Wideband Spread Spectrum Digital Cellular System Dual-Mode Mobile Station-Base Station Compatibility Standard," "CDMA Digital Common Error Interface Standard," revision 1.0, October, 1990, and "An Overview of the Application of Code division Multiple Access to Digital Cellular Systems and Personal Cellular Networks," May 21, 1992, available from Qualcomm, Inc.—10555 Sorrento Valley Road—San Diego, Calif.

In most CDMA system designs, the speech processor is at the cell site. However, in this illustrated embodiment, the speech processor is on a packet switch (such as 47, 147, and N47), connected to the cell site and the data received at the transceiver is packetized and then sent through a packet network to the designated speech processor. A system and method for such packetization and routing through the packet networks is described in U.S. Pat. No. 5,438,565 and U.S. Pat. No. 5,363,369, both of which are assigned to the assignee of this invention, and which are incorporated herein by reference.

In this exemplary embodiment, wireless telephone (not shown) in car 54 initiates a call to telephone 100. Car 54 is in cell 5, wherein cell 5 is connected to packet switch 47. Packet handler (PH) 55 receives packets from cell 5 and sends them on bus 61 to speech processor (SP) 57, which connects the call to public switched telephone (PSTN) 3 and, thus, to telephone 100. As mobile 54 moves from cell 5 to cell 7, an executive call processor (ECP) network (not shown for clarity in this figure but well known in the art) informs cell 7 of the speech processor (SP 57) handling the call. As mobile 54 moves into the boundary area between cells 5 and 7, packet handlers 53 and 55 both send packets on bus 61 to speech processor 57. Speech processor 57 continues to be the only connection to PSTN network 3 and, thus, to telephone 100 for this call. Mobile 54 then moves fully into cell 7, and only packet handler 53 sends packets to speech processor 57.

Mobile 54 then moves from cell 7 to cell 9, and then into adjoining cell 25, which is serviced by packet handler 155 at packet switch 147. Cell 25 sends packets to packet handler 155, which places them on packet bus 161. Gateway 202 recognizes that the address is not for a member of the packet bus 161 community, encapsulates the packets with ATM protocol, as described in the above-referenced patent applications, indicating the destination community and sends them through self-routing asynchronous transfer mode (ATM) network 101. Self-routing ATM network 101 examines the address and routes the cells to the appropriate gateway, which in this case is gateway 200, since the cells are destined for packet bus 61 and speech processor 57. Encapsulated packets arrive at gateway 200 in packet switch 47, are reassembled, and put on packet bus 61 for speech processor 57.

Similarly, when mobile 54 moves through cells 27 through 39, and all intervening cells, all packets are sent to/from speech processor 57, since all of the packet switches are connected to ATM network 101. Thus, the call from speech processor 57 through PSTN 3 to telephone 100 does not have to be torn down as mobile 54 traverses cell and switch boundaries. Therefore, no hard hand-off ever takes place throughout the entire network. An entire metropolitan area may be connected in this manner, with all cellular switches connected to one ATM network.

In the above example, only one wireless telephone is shown. In reality, there are many wireless devices, all sending calls to speech processors which are not necessarily on the same packet switch. Therefore, more packet handlers send packets to speech processors that are not on the same packet switch and, thus, send more traffic through their responsive gateways 200 and 202, than they send to a destination on their own packet bus. So, for example, if there are 50 speech processors in the packet switch network of FIG. 1 equally distributed among five switches, then only one fifth (on the average) of all packets will be handled in the same packet switch. That means four fifths of the packet traffic will be sent through gateways. Additionally, CDMA packet traffic is packetized voice samples which are very time sensitive. If these packets are not delivered at a nearly steady rate, the call will be torn down. Thus, having a high bandwidth (i.e., the rate at which the gateways can transfer data) of gateways 200 and 202 is critical to avoiding overload by heavy time-sensitive packet traffic being sent to other switches.

A problem in the art is that there is no system and method for increasing the throughput capacity of gateways, such as those seen in FIG. 1, when the nodes on the gateway's network are sending many messages to other networks.

SUMMARY OF THE INVENTION

This problem is solved and a technical advance is achieved in the art by a system and method that increases the throughput of inter-network gateways and thus achieves a higher bandwidth than prior art systems. A gateway according to this invention includes a source of packet traffic wherein packets waiting to be transmitted are stored in a buffer, a destination for said packets, wherein packets are written to an interface circuit which transmits the packet over the interconnection medium, a microprocessor for transferring packets between the receive buffer and the interface circuit and for performing any packet protocol translations and a bus that interconnects the components. In the prior art, the microprocessor controls all data transfers. In accordance with the present invention, control is periodically given to a hardware assist engine, which detects the presence of packets in the source buffer and causes the source buffer to output one or more packets to the destination directly, thus by-passing the microprocessor completely. By this system, bandwidth is improved by the source and the destination working directly together, without having the overhead associated with data transfers that require intervention of a microprocessor. Advantageously, the hardware assist engine examines the header of a first packet in the source buffer to determine whether the packet contains data to be transferred or a control message for the microprocessor. If the packet contains control data, then the hardware assist engine delivers the data to a buffer to be read by the microprocessor. If the packet contains data to be transferred, then the hardware assist engine advantageously calculates the destination address of the destination network, encapsulates the data, and transmits the data on the transfer network, such as the ATM network of FIG. 1. In this manner, bandwidth is increased because the microprocessor is not required to set up data delivery or to derive or perform translations of network destination addresses.

BRIEF DESCRIPTION OF THE DRAWINGS

A more complete understanding of the invention may be obtained from consideration of the following description in conjunction with the drawings, in which.

DETAILED DESCRIPTION

Figure 1:
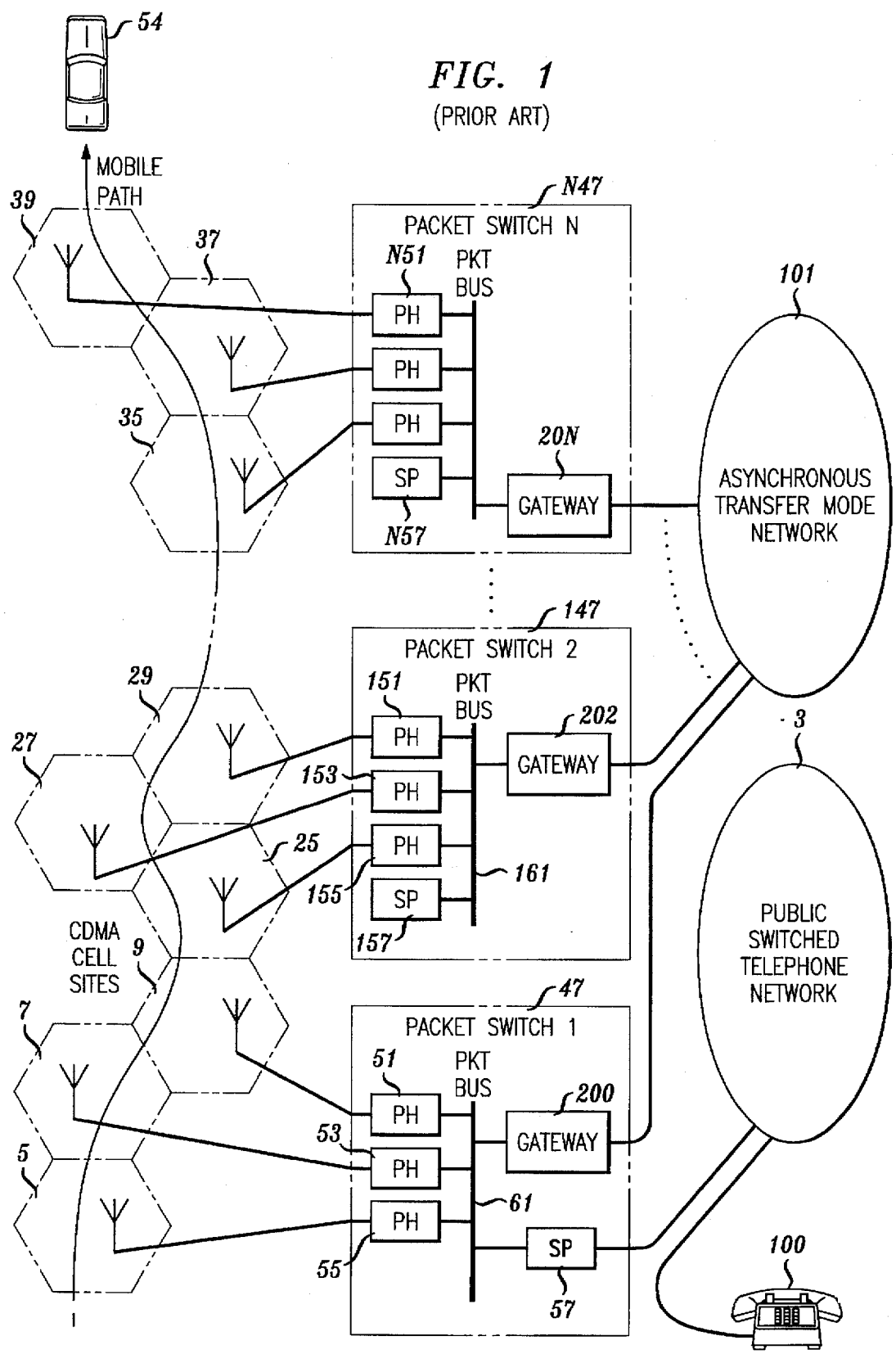
FIG. 1 is a block diagram of a prior art code division, multiple access wireless telephone communications network wherein a plurality of switches within a metropolitan area are connected to each other by gateways incorporating an exemplary embodiment of this invention.
Figure 2:
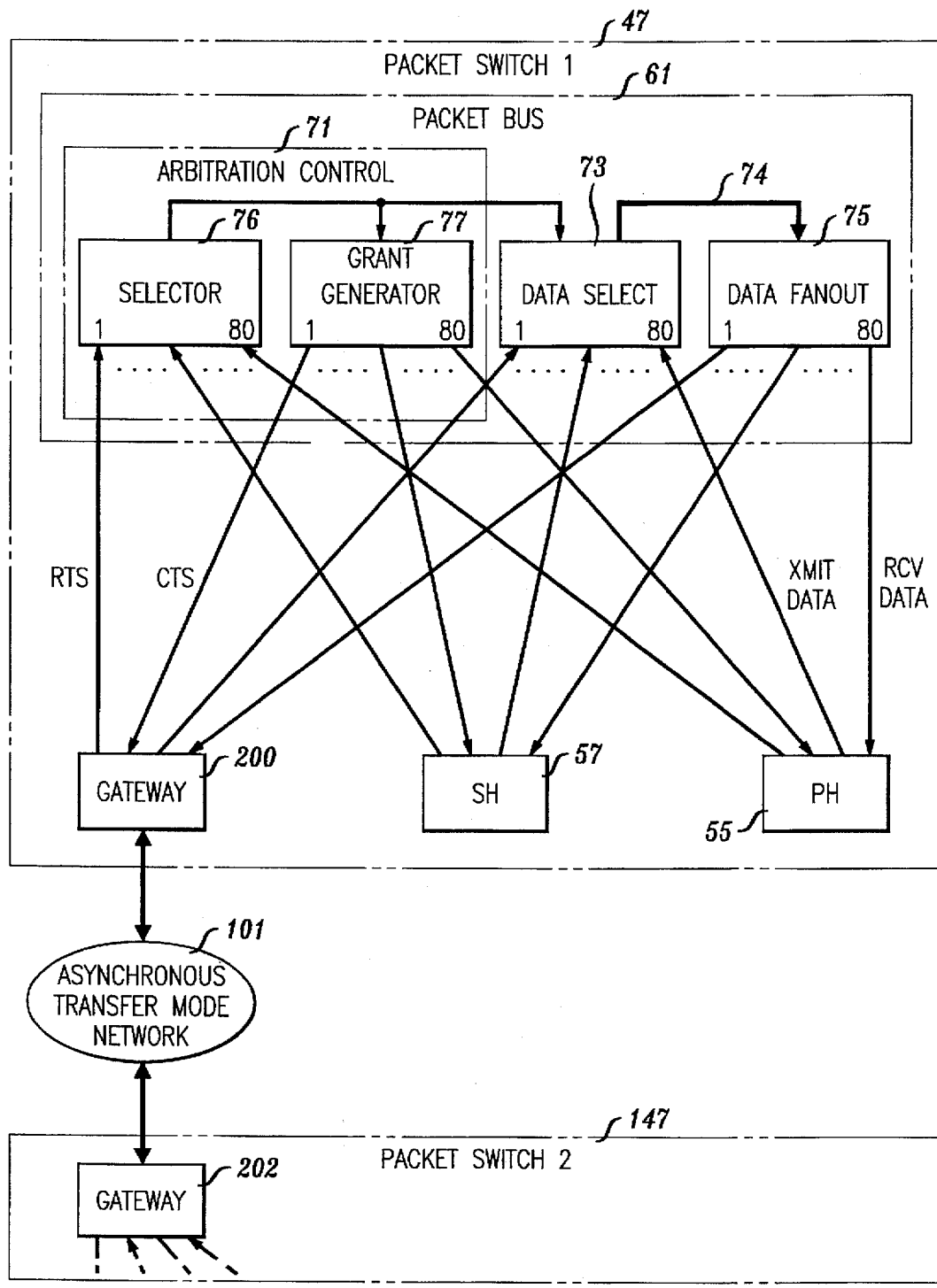
FIG. 2 is a block diagram of an exemplary packet network from FIG. 1.

Turning now to FIG. 2, a prior art packet switch unit 47 is shown in which an exemplary embodiment of this invention may be used to increase throughput of the gateway. Packet switch 47 is connected to ATM network 101 via gateway 200. As in FIG. 1, packet switch 47 comprises a plurality of speech handlers represented by speech handler 57 and a plurality of packet handlers represented by packet handler 55. There is also a gateway 200 according to an exemplary embodiment of this invention, as will be described further below in connection with FIG. 3 and FIG. 4. According to an exemplary embodiment of this invention, there may be up to 80 different units (such as speech handlers and packet handlers) in packet switch 47.

Packet bus 61 comprises arbitration control (arbiter) 71, data select 73, and data fanout 75. Arbiter 71 maintains orderly transmission access to the units by determining which unit has the right to transmit packets. Data select is under control of arbiter 71 and selects data from one of the units connected to packet bus 61, depending on which unit arbiter 71 granted transmission rights. The selected data is then moved from data select 73 over bus 74 to data fanout 75. Data fanout 75 broadcasts the selected data passed to it from data select 73 to all units connected to packet bus 61. If a unit recognizes that the address in the data packet is for that particular unit, the unit receives the data and puts it into a receive buffer (as will be described below). If the unit sees that the address is not for that unit, the unit ignores the packet.

As seen in FIG. 1, packet handlers 55 and speech handlers 57 outnumber gateways, such as 200. Packet handlers 55 send packets anywhere in the system for call handling. As shown above, gateway 200 receives the majority of packets transmitted on packet bus 61 by all other units. Due to the bi-directional nature of most traffic, gateway 200 will also generate the majority of packets transmitted on packet bus 61. Further, due to the time-sensitive nature of the CDMA transmissions, it is very important that gateway 200 handle all packets in a timely manner without dropping any packets, which would cause unacceptable tear down of in-progress calls. Thus, acknowledgment and retransmission protocols must be minimized, and a very high throughput capacity must be achieved.

Figure 3:
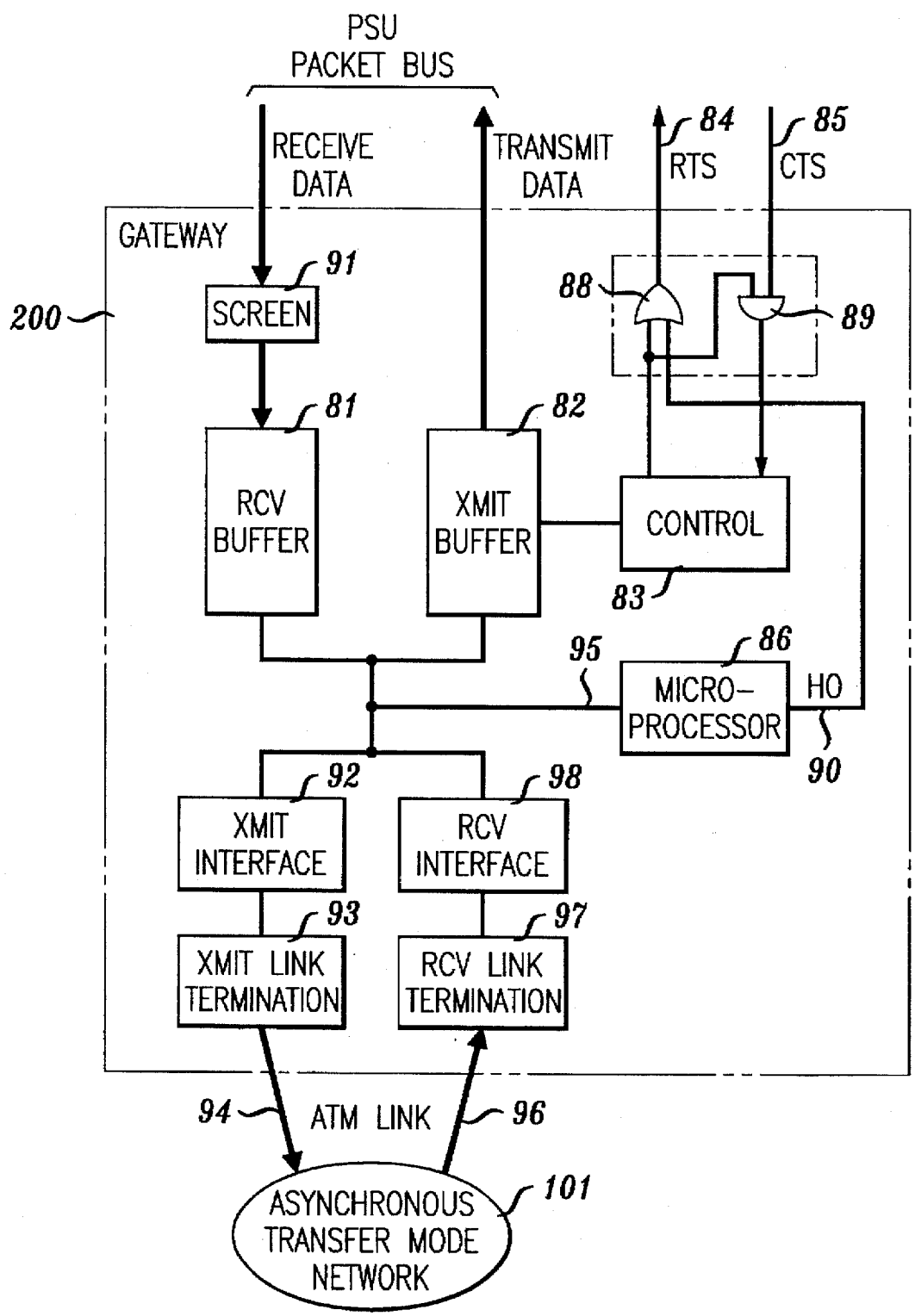
FIG. 3 is a block diagram of a gateway connected to the packet network of FIG. 2.

Turning now to FIG. 3, gateway 200 is illustrated in a block diagram. Gateway 200 includes a packet bus receive buffer 81 for receiving packets from the packet bus, and a packet bus transmit buffer 82 for queuing packets before they are transmitted to the packet bus. Packet bus receive buffer 81 receives packets from data fanout 75 (FIG. 2), through screen 91. Screen 91 monitors the address of received packets and only allows packets with an address used by gateway 200 to pass to packet bus receive buffer 81. Microprocessor 86 then controls transfer of the completed packet from the packet bus receive buffer to the transmit interface 92, which in this embodiment is an ATM interface that prepares the data for transmission on ATM network 101 and passes this data through the transmit link termination circuit 93 and onto the ATM link 94.

Microprocessor 86 first reads the complete packet from packet bus receive buffer 81 using microprocessor bus 95, determines the appropriate ATM header information (VPI, VCI) to be used on the ATM network 101 for this packet, programs the transmit interface 92 with the appropriate ATM header information to be used for this packet and writes the packet data into the transmit interface 92. In this embodiment, transmit interface 92 appends the AAL5 protocol as known in the art, segments the packet into ATM cell payloads, and generates ATM cells using the programmed header information for this packet.

Gateway 200 also receives data from ATM network 101 and ATM link 96 through receive link termination 97 and passes this data into the receive interface 98. Receive interface 98 removes the ATM encapsulation information, reassembles packets (if they are larger than the ATM cell payload), and queues the reassembled packets in an internal buffer in receive interface 98. Receive interface 98 makes certain status information about this packet available to microprocessor 86. In this embodiment, this status information includes the ATM header information (VPI, VCI, and Payload type), the length of the packet, and any errors (i.e. CRC errors) associated with this packet. Microprocessor 86 reads the status information from receive interface 98, then reads the packet data from the receive interface buffer and writes the data into the packet bus transmit buffer circuit 82.

As stated above, the architecture of packet switch 47 (FIG. 2), and network (FIG. 1) tend to cause gateway 200 to process a much larger number of packets than the other units on the packet bus. The processing capacity of the gateway 200 in FIG. 3 is limited by the speed of microprocessor 86 and its ability to read packet data from packet bus receive buffer 81, program the transmit interface 92, and write the data to transmit interface 92; and to read packet data from the transmit interface 98 buffer in the receive interface 95 and write it into packet bus transmit buffer 82.

Figure 4:
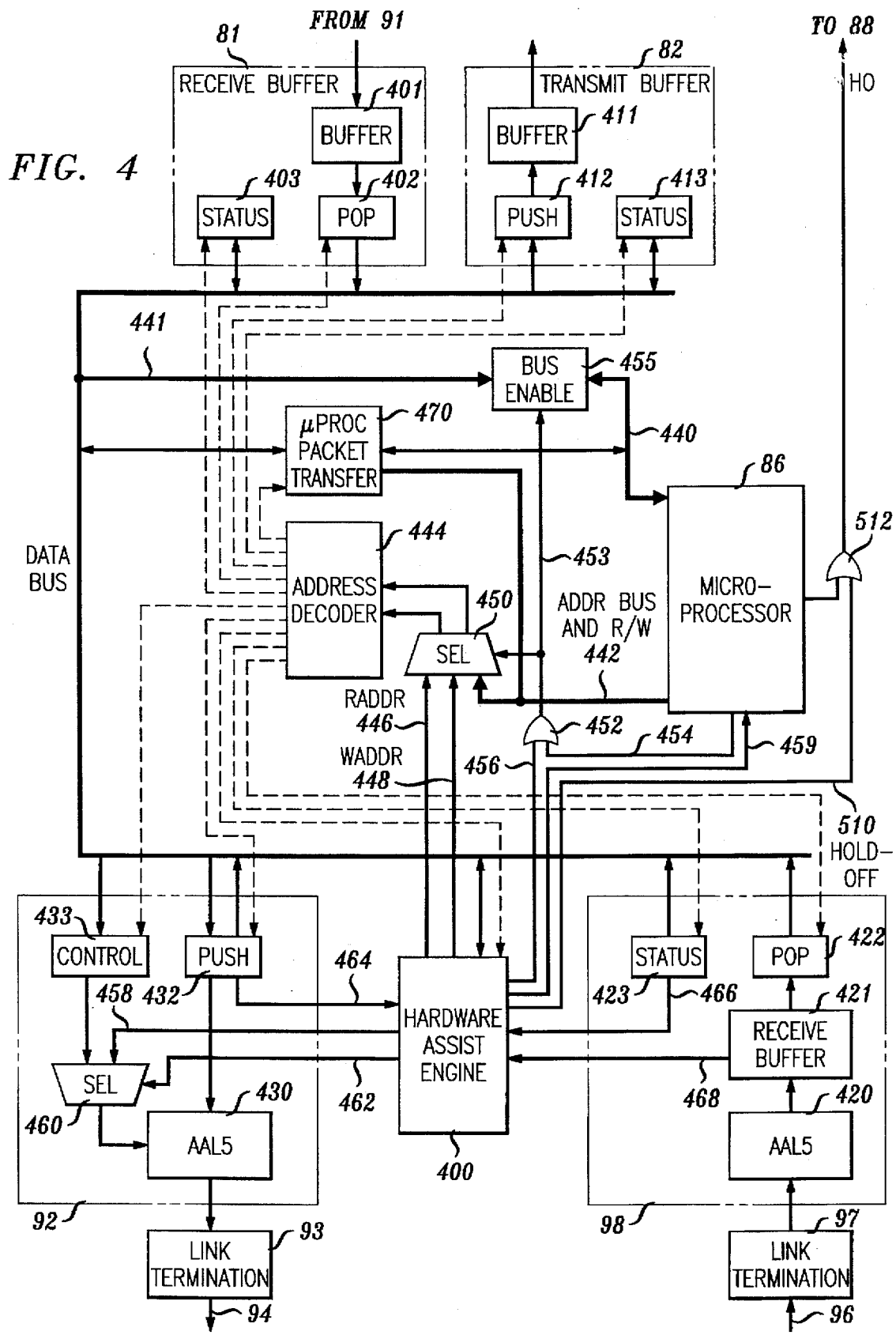
FIG. 4 is a more detailed block diagram of the gateway of FIG. 3, illustrating an exemplary embodiment of this invention.

Turning now to FIG. 4, the throughput of gateway 200 is increased in accordance with this invention by the addition of a hardware assist engine 400. To facilitate the description of the hardware assist engine 400, receive buffer 81, transmit buffer 82, transmit interface 92, receive interface 98 and the microprocessor data bus 95 (including address decoding functions) are shown in greater detail.

Receive buffer 81 comprises a First-In-First-Out (FIFO) buffer (memory) 401, a pop register 402 where the next data word of data from the FIFO buffer memory 401 can be read, and a status register 403 where the status of receive buffer 81 can be read. The status information includes an indication of whether a packet is available in the FIFO, the length of the packet, any errors associated with the packet, and how full the FIFO buffer memory 401 is.

Transmit buffer 82 comprises a First-In-First-Out (FIFO) buffer (memory) 411, a push register 412 where the next data word of packet data to the FIFO buffer memory 411 can be written, and a status register 413 where the status of transmit buffer 82 can be read and written. Status register 413 is either written with the length of the packet to be transmitted, or is written with an end-of-packet indicator. In the exemplary embodiment, a frame information word is written to status register 413 at the end of each packet to signal the end of the packet. The frame information word also contains the length of the just written packet, so that packet length errors can be detected. Transmit buffer status register 413 can also be read to determine the status of transmit buffer 82. The transmit status information available includes an indication of any errors associated with the transmit buffer, and how full the FIFO buffer memory 411 is.

Receive interface 98 comprises an AAL5 reassembly function 420 which reassembles individual ATM cells received from receive link termination circuit 97 into the variable length packet bus packet and removes the appended AAL5 protocol. Receive interface 98 also includes a First-In-First-Out (FIFO) buffer 421 which contains completed packets received from the AAL5 reassembly 420, a pop register 422 where the next data word of packet data from the FIFO buffer 421 can be read, and a status register 423 where the status of receive interface 98 can be read. The status information includes an indication of whether a packet is available in FIFO 421, the length of the next packet, the received ATM header information (VPI, VCI, payload type, etc.) associated with the next packet, any errors associated with the packet, and how full buffer 421 is.

Transmit interface 92 comprises an AAL5 segmentation function 430 which appends AAL5 protocol to the packet and segments the variable length packet bus packet into individual ATM cells for transmission on ATM network 101 through transmit link termination circuit 93. Transmit interface 92 also includes a push register 432 where the next data word of packet data for transmission can be written. In an exemplary embodiment of this invention, the transmit interface 92 does not require a transmit FIFO buffer, because the speed of the ATM link is faster than the speed of the packet bus to which the gateway is connected. In this situation, there is no contention transmitting a cell to the ATM link; and, therefore, data does not become backed-up in transmit interface 92. In situations where the interface speed is slower than the packet bus speed, or where there is contention on the interface that may require queuing, a transmit interface FIFO buffer can easily be added to transmit interface 92 without departing from the scope of the invention.

Transmit interface 92 also includes a control register 433 where the control information for the next packet can be written. Transmit interface control information includes the length of the packet to be transmitted, the ATM header information (VPI, VCI, payload type) to be used on the next packet, and an indication of whether the AAL5 protocol is to be appended or whether the packet is to be directly transformed into an ATM cell without any AAL5 protocol appended. Control register 433 may also be read to determine how full the interface transmit FIFO buffer memory is (if one were present).

Figure 5:
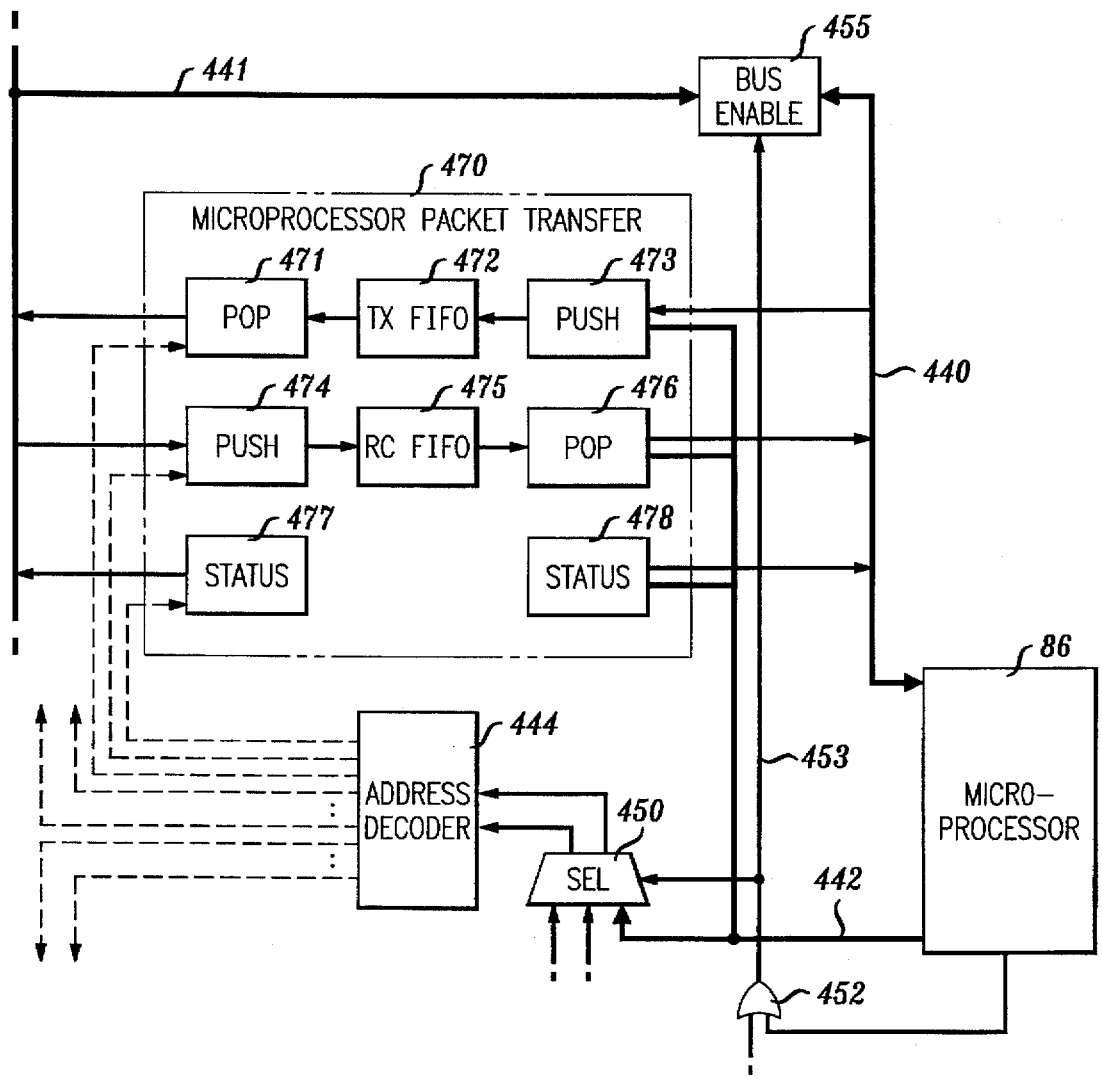
FIG. 5 is a detail illustration of the microprocessor FIFO structure of FIG. 4.

Turning now to FIG. 5, microprocessor bus 95 (FIG. 3) is shown in greater detail and comprises a data bus 440/441 and an address bus 442. The microprocessor data bus is split into two segments: a local data bus 440 and a peripheral data bus 441. The two segments of the data bus are connected together by a bi-directional bus enable circuit 455. Microprocessor local data bus 440 connects the microprocessor 86, the local side of microprocessor packet transfer push 473, pop 476 and status 478, registers, the local side of bus enable 455, and any RAM or PROM required (not shown). Peripheral data bus 441 connects each of the readable and writable registers in the various receive and transmit circuits to the peripheral side of bus enable 455. When bus enable 455 is enabled, microprocessor 86 can read and write all registers on gateway 200. When bus enable 455 is disabled, microprocessor 86 can only read and write registers on local data bus 440. Microprocessor address bus 442 contains the register address and read/write signal from the microprocessor. Microprocessor 86 generates an address corresponding to the specific register to be accessed and a read or write signal indicating whether that register is to be written with data from the data bus or whether its contents are to be placed onto the data bus. The address and read/write signal enter an address decoder 444, which generates individual register selects to each possible register along with the read/write indication.

When microprocessor 86 is controlling the entire operation of the gateway, address decoder 444 generates only a single register select at any given time with the specific register either being written or read by the microprocessor. FIG. 4 depicts the address decode function as a single entity, although, as is well known in the art, the address decode function can be implemented at multiple levels, with the highest levels of address decoding occurring on a circuit board level, and lower levels of address decoding occurring within individual integrated circuit devices that contain multiple registers to be accessed.

Several hardware assist circuits are added to gateway 200 of FIG. 4 in accordance with this invention to increase the gateway throughput capacity. A hardware assist engine 400 is added which automatically takes over the task of transferring packets between receive buffer 81 and transmit interface 92 or receive interface 98 and transmit buffer 82 without intervention of microprocessor 86. Hardware assist engine 400 also connects to data bus 441 to allow it to be controlled from microprocessor 86 and to allow transfer of data between various status and control registers and itself.

Hardware assist engine 400 directly controls the transfer of data from a receive buffer pop 402 or receive interface pop 422 to a transmit buffer push 412 or transmit interface push 432 register by generating two addresses for gateway 200: a read address bus (address bus (herein "RADDR" 446) and a write address bus (herein "WADDR" 448). In a packet bus-to-interface transfer operation, RADDR 446 indicates the address of the receive buffer pop register 402, and WADDR 448 indicates the address of the transmit interface push register 432. This action causes a word of packet data to be directly transferred from receive buffer 81 to the transmit interface 92 without passing through microprocessor 86. In an interface-to-packet bus transfer operation, WADDR 448 indicates the address of the transmit buffer push register 412, and RADDR 446 indicates the address of the receive interface pop register 422. This action causes a word of packet data to be directly transferred from the receive interface 98 to transmit buffer 82 without passing through microprocessor 86.

To allow hardware assist engine 400 to control gateway 200 and thus realize the increased throughput, gateway 200 must be placed in hardware assist mode. To enter hardware assist mode, gateway 200 selects the hardware assist engine address buses RADDR 446 and WADDR 448 as the source of its addresses and read/write signals instead of the microprocessor generated address bus 442. Selector 450 is added to select the source of address control for gateway 200. Selector 450 is controlled from both hardware assist engine 400 and microprocessor 86 via signal 453 from OR gate 452. Signal 453 also controls bus enable 455. Microprocessor 86 initially relinquishes its control lead 454 to OR gate 452 and then writes hardware assist engine 400 to take control of gateway 200 for a given operation. Hardware assist engine 400 then asserts its control lead 456 to OR gate 452 (by lowering it in this exemplary embodiment). The output 453 of OR gate 452 then directs selector 450 to select the address inputs 446 and 448 from hardware assist engine 400 and directs bus enable 455 to isolate the two data buses. At the end of the hardware assist operation, hardware assist engine 400 relinquishes its control lead 456 to OR gate 452 by raising it, and OR gate 452 directs selector 450 to receive address information directly from microprocessor 86 and reconnect the two segments of data bus 440, 441. As a safety precaution, microprocessor 86 can interrupt hardware assist engine 400 at any time and regain control of the address bus and peripheral data bus by asserting its control lead 454 to OR gate 452. Hardware assist engine 400 informs microprocessor 86 that it has finished the hardware assist operation and has returned address control to it by asserting a DONE line 459 directly connected to microprocessor 86.

Address decoder 444 accommodates the hardware assist function by allowing two register selects to be active simultaneously. When microprocessor 86 is controlling the operation of gateway 200, address decoder 444 generates only a single register select at any given time with the specific register either being written or read by microprocessor 86. When hardware assist engine 400 is controlling the operation of gateway 200, address decoder 444 generates two register selects simultaneously, one with a read indication and the other with a write indication, to enable the data transfer.

In transmit interface 92, packet control information (length, VPI, VCI, etc.) used in outgoing packets comes from the control register 433 when microprocessor 86 is controlling gateway 200. When hardware assist engine 400 is controlling gateway 200, for some modes of operation, it generates the packet control information directly via packet control information line 458. Selector 460 is added to transmit interface 92 to select the source of the packet control information. Selector 460 is controlled by hardware assist engine 400 via selector control line 462. Hardware assist engine 400 also has the ability to monitor the packet data passing through the interface transmit push register 432. The monitoring function recovers the destination community address and destination processor address from the incoming packet and makes this information available to hardware assist engine 400 via monitor line 464.

In the receive from ATM link 96 direction, hardware assist engine 400 monitors receive interface status register 423 for received packet length and errors via monitor line 466. Hardware assist engine 400 monitors the packet data of the next packet in the receive interface FIFO buffer 421. The monitoring function recovers the destination community address and destination processor address from the incoming packet and makes this information available to hardware assist engine 400 via monitor line 468.

One mode of operation of the hardware assist engine provides a high speed single packet transfer, which is similar to a Direct Memory Access (DMA) application on other microprocessor based systems. In this mode, microprocessor 86 polls receive buffer status register 403 and receive interface status register 423 to detect whether a complete packet is present in one of the buffer FIFOs. As an example, assume it detects that a complete packet is available in receive buffer 81. Microprocessor 86 reads receive buffer status register 403 to determine if there are any errors in the packet and to determine the length of the packet. Microprocessor 86 then reads the receive buffer pop register 402 to read the first few bytes of the packet. These first few bytes of the packet contain the destination community address and the destination processor address. Microprocessor 86 then determines appropriate ATM header information (VPI, VCI, etc.) for this packet using a software algorithm. In an exemplary embodiment of this invention, this software algorithm uses the destination community and destination processor address to compute the required ATM VPI and VCI. Microprocessor 86 then writes the transmit interface control register 433 with the computed ATM header information. Microprocessor 86 then writes transmit interface push register 432 with the first few bytes of the packet that it previously read. Microprocessor 86 then computes the remaining length of packet to be transferred by subtracting the number of bytes it has already transferred from the total packet length that was previously read from the receive buffer status register 403.

Microprocessor 86 then writes hardware assist engine 400 with the remaining length to be transferred and the mode of transfer, which in this case is a single-packet, DMA-like transfer from the receive buffer pop register 402 to the transmit interface push register 432. Hardware assist engine 400 asserts its control lead 456 to OR gate 452 which directs selector 450 to select the hardware assist engine 400 as the source of address control information. Hardware assist engine 400 then generates a RADDR 446 indicating that receive buffer pop register 402 is being read, and a WADDR 448 indicating that transmit interface push register 432 is being written. These addresses are then continually read and written until all remaining bytes of the packet have been transferred. At this point hardware assist engine 400 relinquishes control of the address bus by deactivating its control lead 456 to OR gate 452 which causes selector 450 to again select microprocessor 86. Hardware assist engine 400 then asserts the DONE line 459 to microprocessor 86 to indicate that it has completed the single packet transfer operation.

As an example of an interface-to-packet bus transfer, assume it detects a complete packet available in interface receive buffer 98. Microprocessor 86 reads interface receive status register 423 to determine if there are any errors in the packet, the length of the packet, and the received ATM header information (VPI, VCI, etc.) Microprocessor 86 then writes hardware assist engine 400 with the length to be transferred and the mode of transfer, which in this example is a single packet DMA-like transfer from the interface receive buffer pop register 422 to the packet bus transmit push register 412. Hardware assist engine 400 then assets its control lead to OR gate 452 which directs selector 450 to select hardware assist engine 400 as the source of address control information and disables bus enable 455. Hardware assist engine 400 then generates a RADDR 446 indicating that receive interface pop register 422 is being read, and a WADDR 448 indicating that packet bus transmit push register 412 is being written. These addresses are then continually read and written until all remaining bytes of the packet have been transferred. At this point, hardware assist engine 400 relinquishes control of the address bus by deactivating its control lead to OR gate 452 which causes selector 450 to again select microprocessor 86 and bus enable 455 to reconnect the local data bus to the peripheral data bus. Hardware assist engine 400 then asserts DONE signal 459 to microprocessor 86 to inform it that it has completed the single packet transfer operation. Microprocessor 86 then writes a frame information word to transmit buffer status register 413 which indicates the end of the packet and that the packet can now be transmitted onto the packet bus.

This single packet transfer mode of operation using hardware assist engine 400 significantly increases gateway throughput by not requiring most bytes of each packet to pass through microprocessor 86. However, in this mode of operation, microprocessor 86 is still involved with initiating each single packet transfer, setting up the required ATM information and programming the hardware assist engine to transfer the remaining portion of the packet. While this mode of operation represents one aspect of this invention, a further and more substantial increase in gateway throughput may be achieved if microprocessor 86 did not have to perform any processing at all on each individual packet.

It is a further aspect of this invention to perform a continual hardware assist function. In a continual hardware assist mode, the hardware assist engine 400 is responsible for polling the individual status registers, determining whether packets are present and packet length, monitoring the destination community address and destination processor address, computing the appropriate ATM header, selecting that the interface transmit circuit use that header, and directly transferring the remainder of the packet without any involvement of microprocessor 86 at all. DONE line 459 is no longer asserted after a single packet has been transferred. Hardware assist engine 400 merely returns to scanning the status registers to determine when a new packet is ready for transfer.

Figure 6:
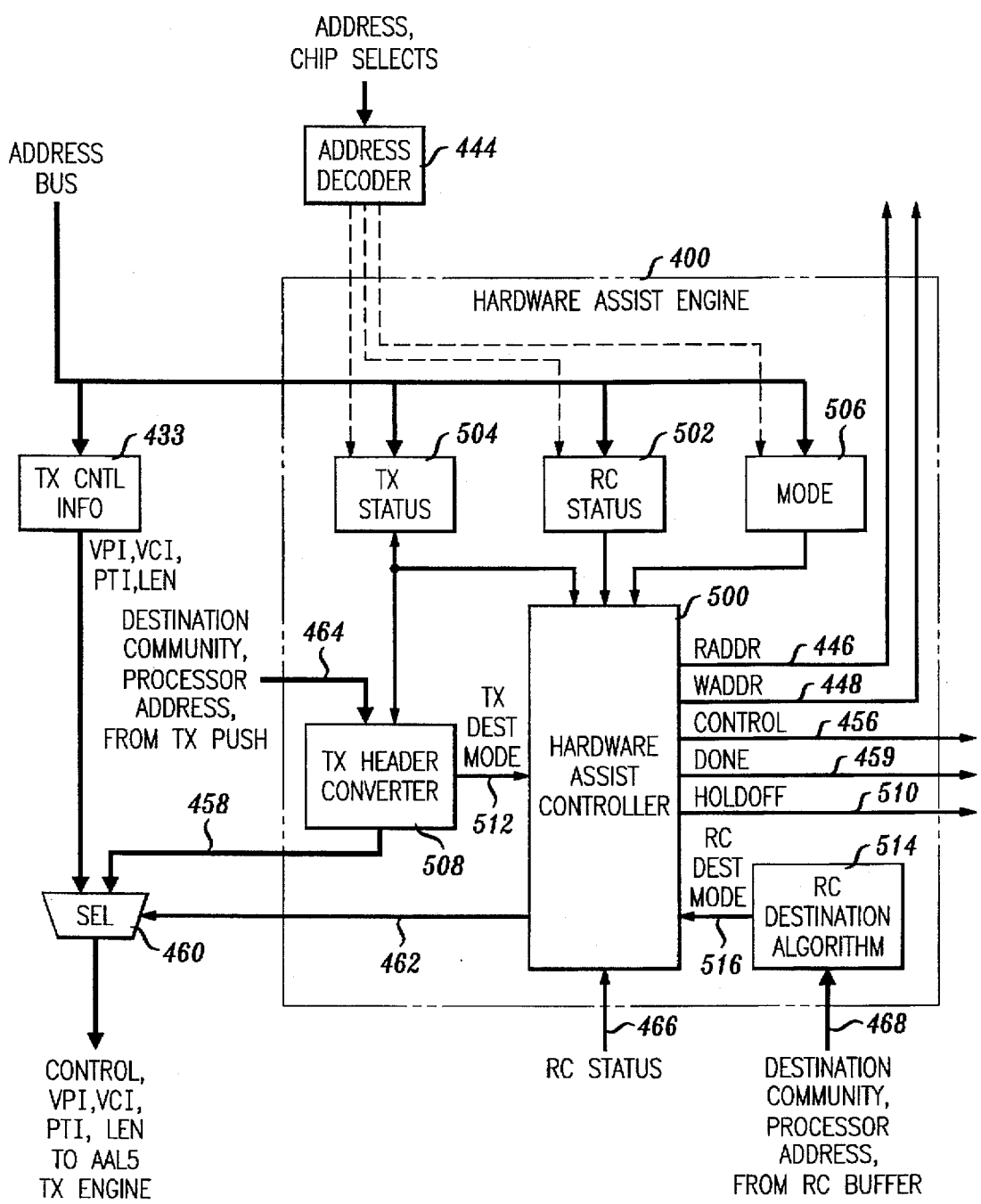
FIG. 6 is a block diagram of the hardware assist engine of FIG. 4 according to an exemplary embodiment of this invention.

Turning now to FIG. 6, hardware assist engine 400 is shown in greater detail. Hardware assist engine 400 includes a hardware assist controller 500, which is responsible for generating the read address RADDR 446, the write address on WADDR 448, and the sequencing of all operations involved in the continual hardware assist operation. In addition, hardware assist controller 500 is responsible for generating select signal 456 to OR gate 452 to control whether microprocessor 86 or hardware assist controller 500 is the source of addresses for the gateway. Hardware assist controller 500 also generates DONE line 459 to microprocessor 86.

To perform the complete hardware assist operation, hardware assist engine 400 must be able to read status information from receive buffer status register 403, and read and write status information to transmit buffer status register 413. In unassisted operation or single packet transfer mode, this information is read and processed by microprocessor 86. In continual hardware assist operation, hardware assist engine 400 reads this status information.

Hardware assist engine 400 includes a receive status register 502 which is written with the status from receive buffer status register 403. This status includes an indication of whether a packet is available in the receive buffer FIFO memory 401, the length of the packet, any errors associated with the packet, and how full FIFO buffer 401 is. To transfer the receive packet status to the hardware assist engine 400, hardware assist controller 500 generates a RADDR 446 indicating that receive buffer status register 403 is to be read and a WADDR 448 indicating that hardware assist engine receive status register 502 is to be written.

Hardware assist engine 400 also includes a transmit status register 504 which is written with the status from transmit buffer status register 413, or which can contain data that is to be written to packet bus transmit buffer status register 413. The transmit buffer status information available from register 413 includes an indication of any errors associated with the transmit buffer, and how full the FIFO buffer 411 is. The data to be written to transmit status register 413 includes an indication of the end of a packet and the length of that packet.

At the end of each packet transferred to the packet bus in continual hardware assist mode, hardware assist controller 500 generates any required frame information word in transmit status register 504 and then generates a WADDR 448 indicating that transmit buffer status register 413 is to be written and a RADDR 446 indicating that hardware assist engine transmit status register 504 is to be read. To transfer the packet bus transmit status to hardware assist engine 400, hardware assist controller 500 generates a RADDR 446 indicating that transmit buffer status register 413 is to be read and a WADDR 448 indicating that hardware assist engine transmit status register 504 is to be written.

Mode register 506 is included in hardware assist engine 400. Mode register 506 is written by microprocessor 86 to inform hardware assist engine 400 of its mode of operation. The mode of operation can be an "unassisted mode" in which hardware assist engine does nothing. Another mode of operation is a "single packet transfer mode," in which the source register, destination register, and length of transfer is loaded into mode register 506. The final mode of operation is "continual hardware assist" mode in which hardware assist engine 400 controls all transfer operations for gateway 200.

In unassisted mode or single packet transfer mode, microprocessor 86 computes the ATM header information and AAL5 packet length information required by AAL5 segmentation function 430. In continual hardware assist mode, this information is supplied by hardware assist engine 400 via packet control information line 458. Hardware assist engine 400 contains a transmit header converter 508 which generates the ATM header VPI, VCI, and AAL5 length parameters. Transmit header converter 508 receives the packet length from transmit status register 504. Transmit header converter 508 also receives the destination community address, destination processor address, and packet type fields via monitor line 464. Monitor line 464 monitored these fields that were recovered from the first few bytes of the packet data written into transmit interface push register 432. Transmit header converter 508 uses this information to generate the ATM header parameters in hardware.

An exemplary embodiment of this invention uses the packet type field received from monitor line 464 to generate a packet priority. Each possible packet type is provisioned as either high or low priority (1 or 0) inside the transmit header converter 508. This preferred embodiment generates the ATM header VPI by taking the destination community number received from monitor line 464, multiplies it by 2 and adds the packet priority (0 or 1). Advantageously, this allows an ATM switch network 101 to route ATM cells between many packet switch units by only examining the VPI field. It also allows the destination gateway to determine the priority of the packet by examining only the VPI field. The preferred embodiment generates the ATM header VCI by taking the destination processor number received from monitor line 464 and adding 128. Advantageously, this avoids using low number VCIs on the ATM interface, many of which have been reserved by various standards bodies for assigned functions.

As an example of continual hardware assist operation, microprocessor 86 first relinquishes its control lead 454 to OR gate 452, and then writes hardware assist engine 400 mode register 506 to enter into continual hardware assist mode. Hardware assist controller 500 then asserts its control lead 456 to OR gate 452 (by lowering it). The output of OR gate 452 directs selector 450 to select the address inputs from the hardware assist controller 500 and to isolate peripheral data bus 441 from local data bus 440. Hardware assist controller 500 next sets selector control line 462 to select the packet control information line 458 being generated from the transmit header converter 508 internal to the hardware assist engine 400. Hardware assist controller 500 then continually polls receive buffer status register 403 and the receive interface status register 423 for an indication of a completed packet ready to transfer. Polling receive buffer 81 is accomplished by setting RADDR 446 to indicate a read of receive buffer status register 403 and setting WADDR 448 to indicate a write to hardware assist engine receive status register 502. The receive interface status register 423 is polled by simply monitoring the receive status line 466 from the receive interface. When either or these two registers indicates a packet ready to transfer, hardware assist controller 500 transfers the packet before returning to polling for new packets.

If the receive status register 502 indicates that a packet is available, other information in the receive status register 502, including the length of the packet and any errors associated with the packet are valid. Hardware assist controller 500 now knows that it must transfer a packet of the specified length from the receive buffer pop register 402 to the transmit interface push register 432. Hardware assist controller 500 sets RADDR 446 to indicate a read of the packet bus receive buffer pop register 402, and sets WADDR 448 to indicate a write to transmit interface push register 432.

Hardware assist controller 500 strobes these addresses until the first few words of packet data have been transferred into push register 432. These first few words of the packet contain the destination community number, the destination processor number, and the packet type fields. These fields are monitored by monitor line 464 and made available to transmit header converter 508. As an example, assume destination community=12, destination processor=34, and packet type=8. Transmit header converter 508 first determines the packet priority of packet type 8 by indexing into a table. This table indicates either 0 or 1 for a low or high priority packet, respectively. Assuming for the purposes of describing this invention, it is a high priority packet, transmit header converter 508 then computes the ATM header VPI (12 times 2 plus 1=25). Transmit header converter 508 computes the ATM header VCI (128 plus 34=162). The AAL5 packet length is recovered from the receive status information register 502. The ATM header VPI, VCI, and AAL5 length are made available via line 458 through selector 460 to AAL5 segmentation function 130. Hardware assist controller 500 continues to strobe the RADDR and WADDR addresses until all bytes of the packet, as indicated by the length field, have been transferred to the transmit interface push register 432. Hardware assist controller 500 then returns to polling receive buffer status register 403 and the receive interface status line 466.

If the receive interface status line 466 indicated that a packet is available, other information in the status word including the length of the packet and any errors associated with the packet is also valid. Hardware assist controller 500 determines that it must transfer a packet of the specified length from the receive interface pop register 422 to the transmit buffer push register 412. Before transferring any packet data, hardware assist controller 500 reads transmit status register 413 to verify that there is sufficient room in the transmit FIFO buffer 411 to hold the packet. Hardware assist controller 500 sets RADDR 446 to indicate a read of the transmit buffer status register 413, and sets WADDR 448 to indicate a write to hardware assist engine transmit status register 504. Part of the status information contained in hardware assist transmit status register 504 indicates the remaining room available in transmit FIFO buffer memory 411. This process repeats until there is sufficient room in the transmit FIFO buffer 411 to hold a new packet of the specified length.

Hardware assist controller 500 then sets RADDR 446 to indicate a write of the transmit buffer push register 412, and sets WADDR 448 to indicate a read of receive interface pop register 422. Hardware assist controller 500 continues to strobe the RADDR and WADDR addresses until all bytes of the packet, as indicated by the length field, have been transferred to the transmit buffer push register 412. Hardware assist engine 500 then generates an end of packet identifier or frame information word containing the length of the packet just transferred and places this information into the hardware assist transmit status register 504. Hardware assist controller 500 then sets WADDR 448 to indicate a write of the transmit buffer status register 413, and sets RADDR 446 to indicate a read of hardware assist engine transmit status register 504. Writing this frame information word will initiate the transmission of the completed packet onto the packet bus. Hardware assist controller 500 then returns to polling the buffer status register 403 and the receive interface status line 466.

Microprocessor 86 can regain control of the gateway by interrupting hardware assist engine 500. In this situation, hardware assist engine 500 finishes the current packet and exits continual hardware assist mode and returns DONE line 459 to microprocessor 86. Alternatively, microprocessor 86 can regain control of the address bus by asserting its control lead 454 to OR gate 452.

The continual hardware assist mode of operation achieves significant increases in gateway throughput capacity by performing all operations involved in packet processing and transfer in hardware and not requiring the intervention of microprocessor 86. The continual hardware assist mode is intended to process normal errorless packets that are to be transformed to or from AAL5 packets on the ATM interface, and that obey the simple header conversion algorithm implemented in hardware.

Another aspect of this invention allows hardware assist engine 400 to recognize abnormal packets and provide reasonable processing of these exception cases. When hardware assist controller 500 reads the various status registers, it also reads any error conditions associated with the current packet. In this exemplary embodiment, hardware assist engine 400 does not attempt to process packets with certain error conditions. For certain error conditions, such as the AAL5 protocol indicating an aborted packet, hardware assist engine 400 is programmed to simply discard the entire packet without transferring it. For other error conditions, such as CRC errors, length mismatch errors, packet bus transmission errors, etc., different processing actions may be desired on different systems. In this exemplary embodiment, hardware assist engine 400 recognizes the error condition, and does not attempt to process the packet at all. It simply exits continual hardware assist mode by asserting its DONE line 459 to microprocessor 86 to inform it to take over processing of the exception packet. When microprocessor 86 finishes processing the exception case, it may return to continual hardware assist mode. By allowing the exception cases to be handled by the microprocessor, the hardware complexity of the hardware assist engine can be reduced. Since the exception cases are encountered infrequently, the throughput capacity of the gateway is not significantly degraded by using the microprocessor to handle these cases.

In many applications, the gateway can also be the source or destination of packets. Packets from the packet bus can either be destined to pass through the gateway and onto the interface, or they can be destined for the gateway microprocessor itself. Packets from the interface can either be destined to pass through the gateway onto the packet bus, or they can be destined for the gateway microprocessor itself. If packets are destined for the gateway microprocessor, they are delivered to microprocessor 86. If packets are sourced from the gateway, they are sourced from microprocessor 86. As previously described, having microprocessor 86 involved in reading or writing a packet will significantly reduce the throughput capacity of the gateway. It is a further aspect of this invention to allow packets to be destined to and sourced from microprocessor 86, while utilizing single packet or continual hardware assist mode to achieve high throughput capacity.

Several circuits are added to allow hardware assist engine 400 to transfer packets to and from microprocessor 86 without significantly degrading throughput capacity. Returning to FIG. 4, microprocessor packet interface circuit 470 is added to transfer packets between the peripheral data bus 441 under hardware assist control to the local data bus 440 under microprocessor control. Returning to FIG. 5, microprocessor packet interface 470 comprises a transmit FIFO 472 for transferring packets from microprocessor 86 to peripheral data bus 441 and a receive FIFO 475 for transferring packets from the peripheral data bus 441 to microprocessor 86.

Microprocessor packet interface 470 includes several registers connected to peripheral data bus 441 and controlled by individual address selects from address decoder 444. The next data word of packet data from transmit FIFO 472 is read from transmit FIFO pop register 471. The next data word of packet data for receive FIFO 475 is written to receive FIFO push register 474. The status of microprocessor packet interface 470 is read at packet interface peripheral status register 477. The status information available includes how full receive FIFO buffer 475 is, an indication of whether a complete packet is available in transmit FIFO 472, the length of the packet, and the direction of the packet in transmit FIFO 472. The direction represents whether the packet is to be sent to the packet bus or to the interface.

Microprocessor packet interface 470 also includes several registers connected to local data bus 440 and controlled by local address bus 442. The next data word of packet data is written to transmit FIFO 472 at transmit FIFO push register 473. The next data word is read from receive FIFO 475 at receive FIFO pop register 476. The status of the microprocessor packet interface 470 can be read at packet interface local status register 478. The status information includes whether transmits FIFO buffer 472 is full, an indication of whether a complete packet is available in the receive FIFO 475, and the length of the packet. Advantageously, these registers are always readable and writable by microprocessor even when the gateway is in hardware assist mode. Since address bus 442 is not selected to control address decoder 444 and bus enable 455 is disabled to isolate local data bus 440 from peripheral data bus 441, microprocessor 86 can continue to read and write these registers at its own speed, while the hardware assist engine 400 controls the peripheral data bus at a high rate of speed.

The RADDR 446 address generated by hardware assist controller 400 can be set to indicate a read of the processor transmit FIFO pop register 471 or microprocessor packet interface peripheral status register 477. The WADDR 448 address generated by hardware assist controller 400 can be set to indicate a write of the processor receive FIFO push register 474. In this fashion, a packet can be transferred to and from these FIFOs under control of hardware assist engine 400. When a packet is available in processor receive FIFO 475, microprocessor 86 can read the packet at its own speed without interrupting the continual hardware assist mode and decreasing the throughput capacity of the gateway.

Several circuits are also added to hardware assist engine 400 to enable the hardware assist engine to determine whether the packet is destined for the local microprocessor or not. Returning to FIG. 6, transmit header converter 508 generates transmit destination mode signal 512 to hardware assist controller 500. Transmit header converter 508 monitors the destination community and processor address from the interface transmit push register via monitor line 464. Internal to transmit header converter 508, a comparison is made between the received destination community and processor address and a preprogrammed local address corresponding to the local microprocessor. If the destinations match, then the current packet being transferred from the packet bus is meant for the microprocessor and not to be transferred across the interface. Transmit destination mode 512 is set to indicate the transmit packet is destined for the microprocessor 86. If the destinations do not match, then the packet being transferred from the packet bus is meant to be transferred across the interface and the transmit destination mode 512 is set to indicate the transmit packet is destined for the interface.

Receive destination algorithm 514 is also added to FIG. 6 to monitor the destination community and processor addresses from the interface receive buffer via monitor line 468. Receive destination algorithm 514 generates receive destination mode signal 516 to hardware assist controller 500. In receive destination algorithm 514, a comparison is made between the received destination community and processor address and a preprogrammed local address corresponding to the local microprocessor. The preprogrammed local address for the receive direction need not be the same as the preprogrammed local address for the transmit direction. If the destinations match, then the packet being transferred from the interface bus is meant for microprocessor 86 and not to be transferred to the packet bus. Receive destination mode 516 is set to indicate the receive packet is destined for microprocessor 86. If the destinations do not match, then the packet being transferred from the interface is meant to be transferred to the packet bus and the receive destination mode 516 is set to indicate the received packet is destined for the packet bus.

It is desirable for a high traffic gateway to support a packet bus holdoff function to avoid receive node overload from significant traffic being sent to the gateway over the packet bus. The problem of receive node overload and the solution to avoid receive node overload using a packet bus holdoff mechanism is described in detail in co-pending patent application Ser. No. 08/342,548, filed on Nov. 21, 1994, assigned to the assignee of this invention, and incorporated herein by reference. It is a further aspect of this invention to incorporate this node overload monitoring and packet bus holdoff generation into the hardware assist engine so that any microprocessor involvement in the packet bus hold off function can be eliminated.

Returning briefly to FIG. 4, hardware assist controller 500 generates holdoff signal 510 when the packet bus receive buffer occupancy reaches a threshold level. Holdoff signal 510 is ORed at 512 with a signal from microprocessor 86. When the holdoff signal is active, it requests transmission rights on the packet bus even if there are no packets queued up for the packet bus in transmit buffer FIFO 411. By requesting and obtaining transmission rights on the packet bus, receive node congestion can be avoided since no other packet bus clients can transmit packets to the gateway during this interval. When the packet bus receive buffer occupancy falls below the threshold level, the packet bus holdoff mechanism is deactivated.

For hardware assist engine 500 to implement the packet bus holdoff function, it must be programmed with the threshold value for the receive buffer 401. Microprocessor 86 writes the packet bus holdoff threshold level as part of the information written to the hardware assist engine mode register 506. During continual hardware assist mode, hardware assist controller 500 is continually polling receive buffer status register 403 and transferring the status information into hardware assist receive status register 502. Part of the status information included in the receive buffer status register 403 is the occupancy of receive FIFO buffer memory 401, or, alternatively, the amount of available room left in buffer memory 401. Hardware assist controller 500 compares this occupancy with a predetermined threshold level every time the occupancy status is read. If the buffer occupancy is greater than the threshold, hardware assist controller 500 activates holdoff signal 510. If the buffer occupancy is less than the threshold, hardware assist controller 500 deactivates holdoff signal 510. Hardware assist controller 500 could also implement a hysteresis in activating and deactivating holdoff signal 510 if desired.

Figure 7:
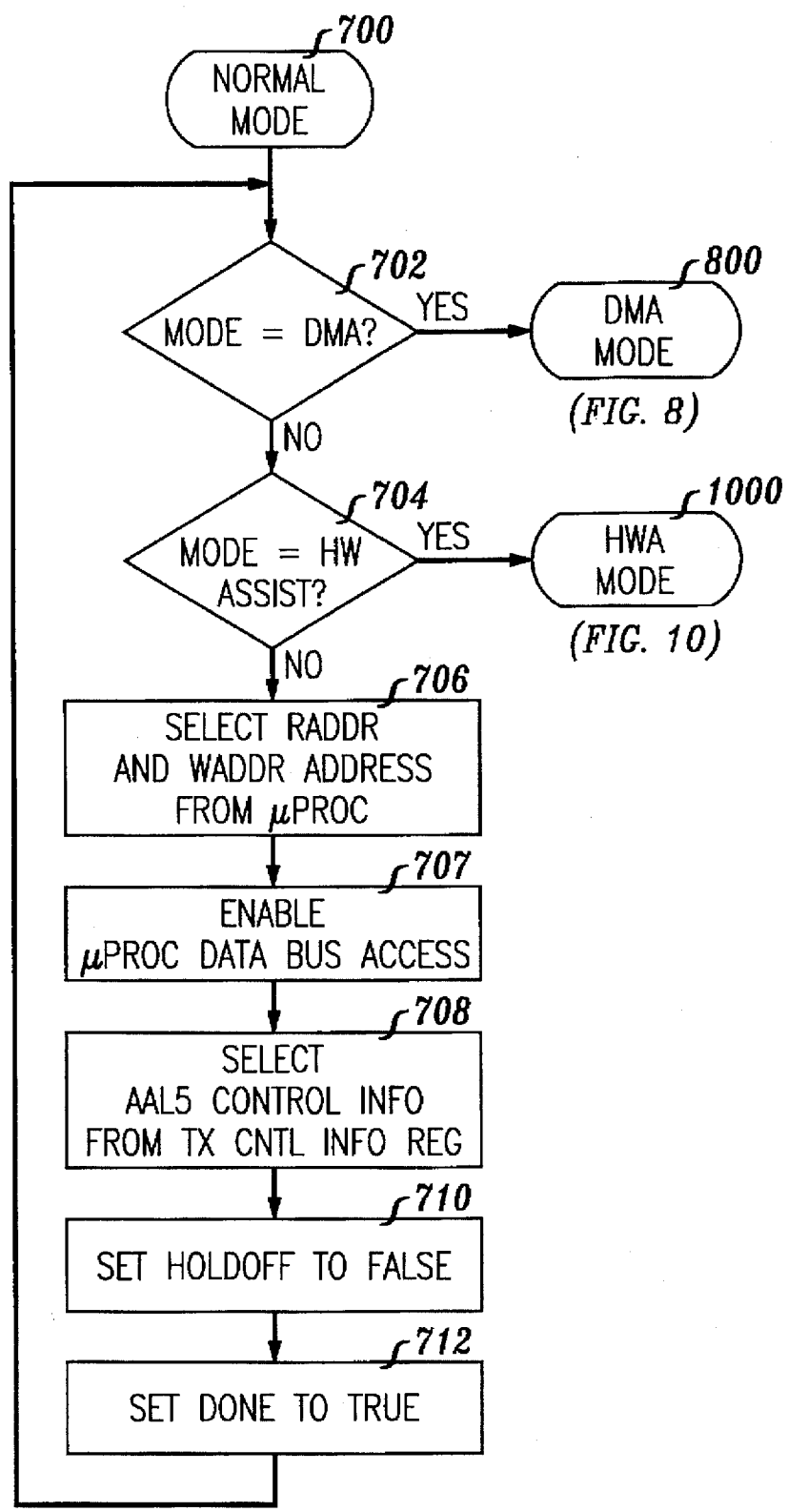
FIGS. 7–14 are flow charts describing the operation of the hardware assist engine of FIG. 6 according to an exemplary embodiment of this invention.

Turning now to FIG. 7, a flow chart of the operation of hardware assist controller 500 is shown. FIG. 7 illustrates the operation of the "normal" mode of the system, that is, when microprocessor 86 is in control of transferring data in gateway 200. Since, hardware assist controller 500 does not generate the read and write addresses, normal packet processing and data transferring is not included in the scope of the hardware assist controller 500 flowchart. Processing enters, either from initialization or from a change in mode, at circle 700. Processing continues to decision diamond 702 where a determination is made if the mode in mode register 506 is set to the DMA mode (single packet transfer mode). If the mode is DMA, then processing continues to the DMA mode flow chart 800 (FIG. 8), which is described below.

If, in decision diamond 702, the mode was not DMA, then processing continues to decision diamond 704, where a determination is made if the mode in mode register 506 is set to "hardware assist." If the mode is set to hardware assist, then processing continues to hardware assist mode circle 1000, which is described in FIGS. 10 through 13 below.

If the mode is not hardware assist in decision diamond 704, then processing continues to action box 706, where the address decoder input is selected from microprocessor 86. Processing continues to action box 707, where bus enable 455 is enabled to allow microprocessor 86 access to the peripheral data bus 441. Processing continues to action box 708, where select line 462 is set such that the AAL5 control information is selected from the transmit control information register 433. Processing continues to action box 710, where holdoff 510 is set to "false" and processing then proceeds to action box 712, where the DONE line 459 is set to "true." Processing loops back to decision diamond 702.

Figure 8:
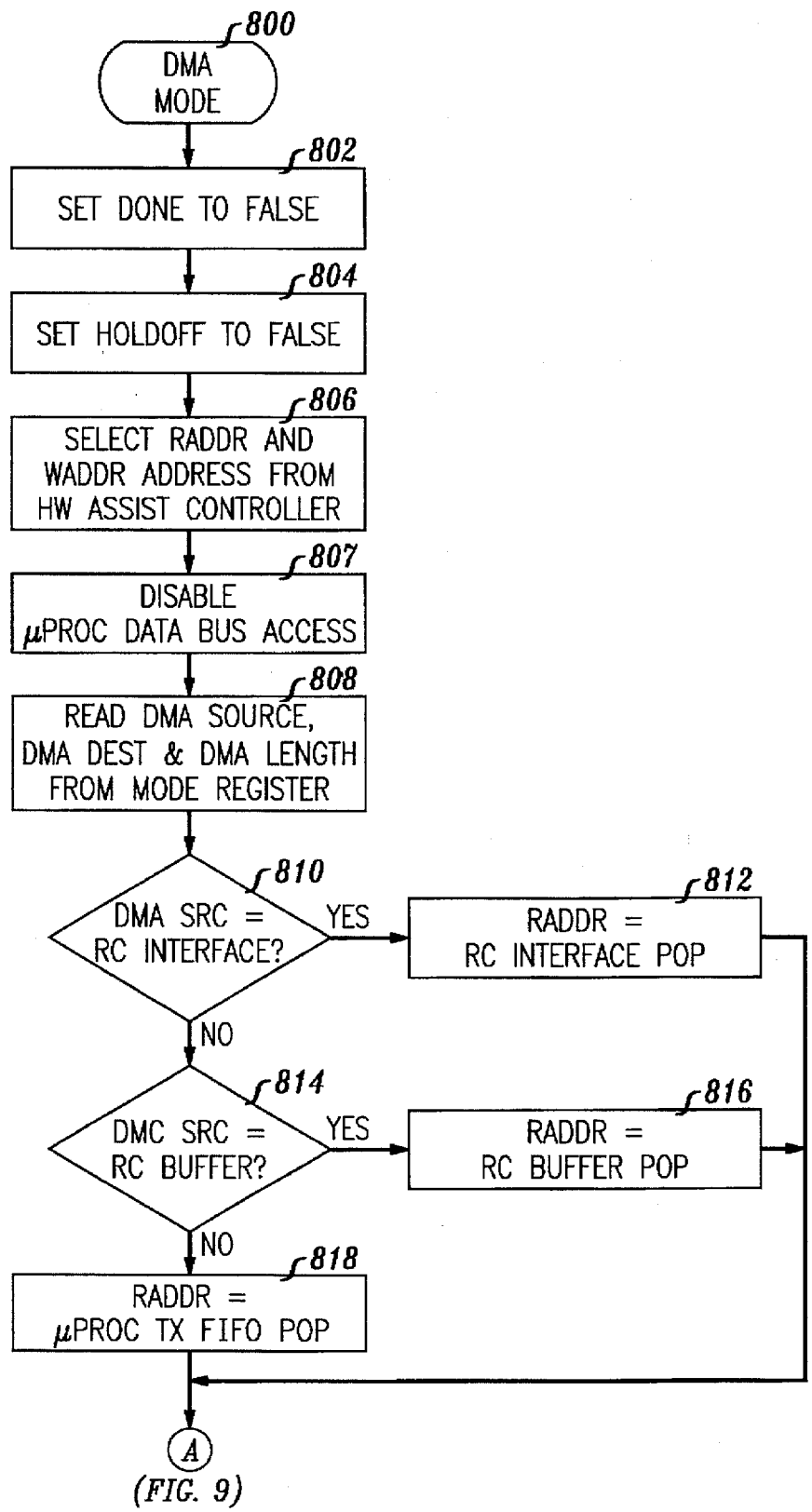
Figure 9:
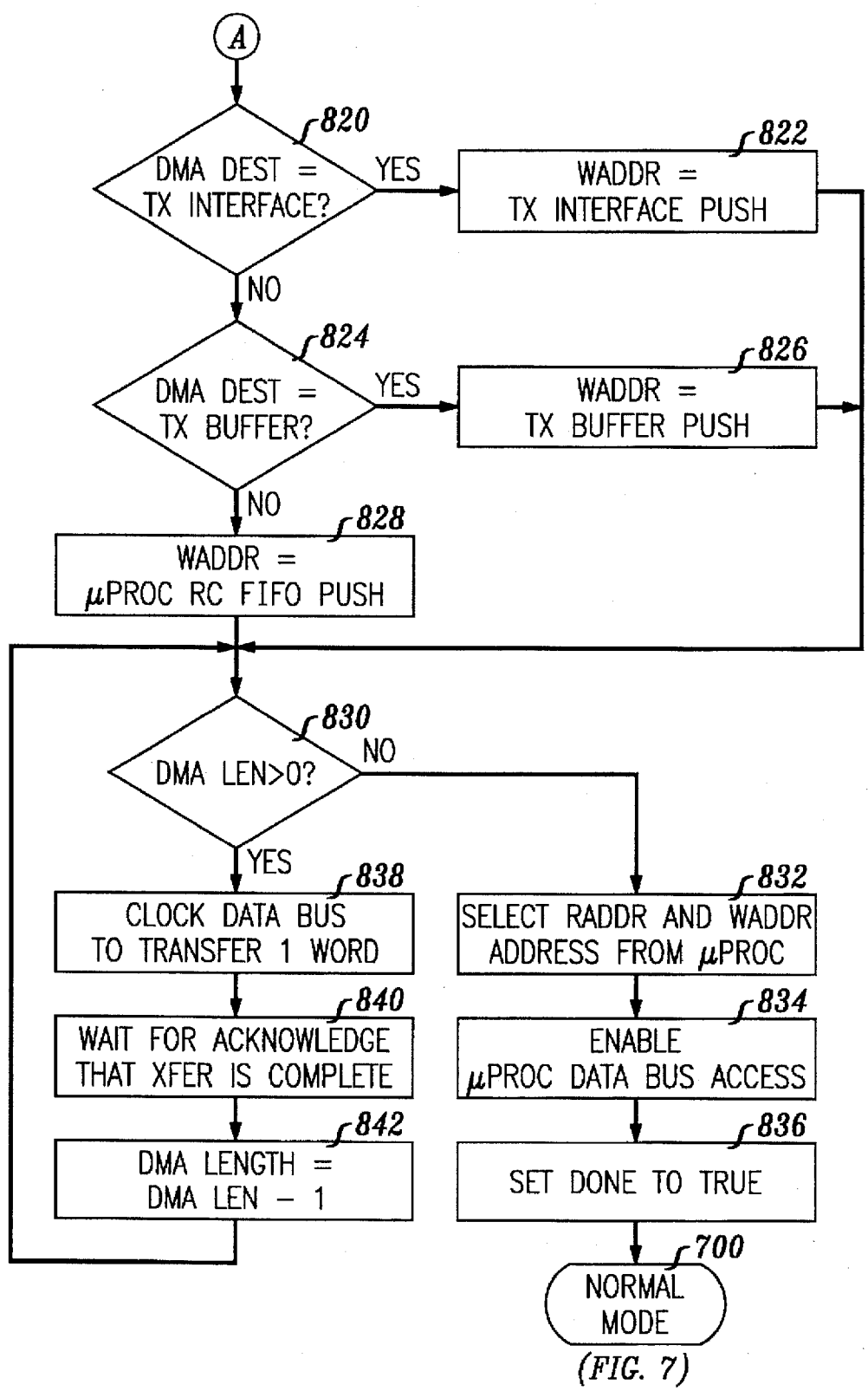

Turning now to FIGS. 8 and 9, processing in the DMA mode (single packet transfer mode) is shown starting at 800. In FIG. 8, processing begins in circle 800 and proceeds to action box 802, where the DONE line 459 is set to "false," and then proceeds to action box 804, where the holdoff line 510 is set to false. Processing proceeds to action box 806, where the address decoder 444 input is selected from RADDR 446 and WADDR 448 addresses from hardware assist controller 500. Processing continues to action box 807, where bus enable 455 is disabled to isolate the data bus 441 from microprocessor 86. Processing continues in action box 808 by reading the DMA source, DMA destination, and DMA length from hardware assist engine mode register 506, as described above. In decision diamond 810, a determination is made whether the DMA source equals receive interface 98. If it is, then processing proceeds to set the RADDR 446 to the receive interface pop register 422 in action box 812.

If, in decision diamond 810, the DMA source is not the receive interface 98, a determination is made if the DMA source is receive buffer 81 in decision diamond 814. If it is, then the RADDR 446 address is set to the receive buffer pop register 402 in action box 816. If, in decision diamond 814, the DMA source is not receive buffer 81, processing proceeds to action box 818, where RADDR 446 is set to the microprocessor transmit FIFO pop register 471. Processing then continues from action boxes 812, 816 and 818 through connector A to FIG. 9.

Turning now to FIG. 9, processing continues from connector A to decision diamond 820, where a determination is made whether the DMA destination equals transmit interface 92. If it is, then WADDR 448 is set to the transmit interface push register 432 in action box 822. If, in decision diamond 820, the destination was not transmit interface 92, then a determination is made in decision diamond 824 whether the DMA destination is transmit buffer 82. If it is, then WADDR 448 is set to the transmit buffer push register 412 in action box 826. If, in decision diamond 824, the destination was not transmit buffer 82, then processing proceeds to action box 828, where WADDR 448 is set to the microprocessor receive FIFO push register 474. Processing proceeds from action boxes 822, 826 and 828 to decision diamond 830, where a determination is made if the DMA length is greater than zero. If it is not, then the DMA has completed and processing proceeds to action box 832, where control line 456 is set to select the address decoder 444 input from the microprocessor 86. Processing then proceeds to action box 834, where bus enable 455 is enabled to allow microprocessor 86 access to the peripheral data bus 441. Processing then continues to action box 836, where the DONE line 459 is set to true and processing returns to normal mode processing 700 in FIG. 7.

If, in decision diamond 830, the DMA length is greater than zero, then processing proceeds to action box 838, where the data bus is enabled to transfer one word. Processing proceeds to action box 840, where the system waits for an acknowledgment that the transfer is complete and then proceeds to action box 842 where the DMA length is decremented. Processing then loops to decision diamond 830, where the length is then again tested to determine if there is more to transmit.

Figure 10:
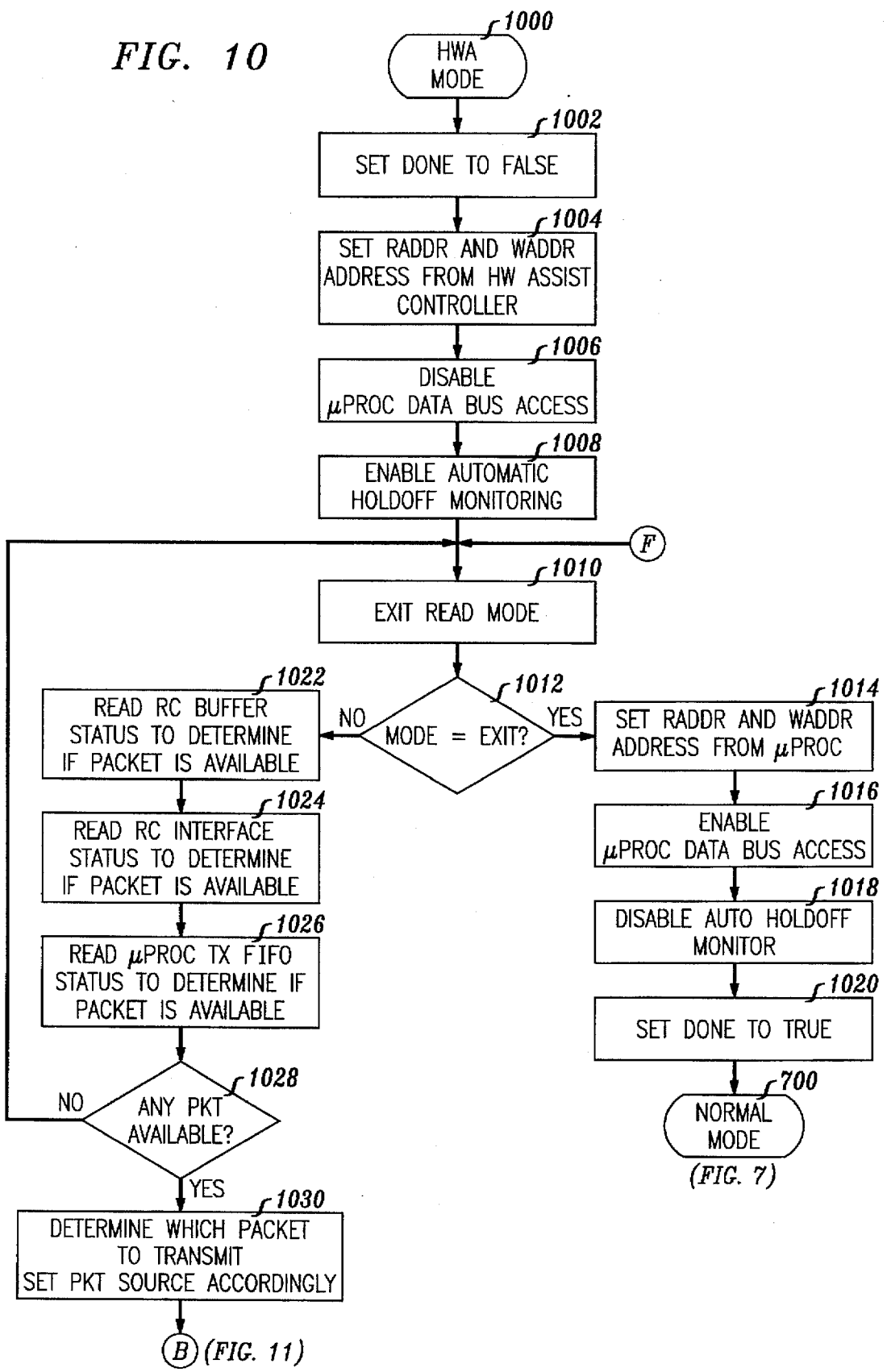

Turning now to FIGS. 10–13, operation in the hardware assist mode is described. In FIG. 10, processing enters the hardware mode at circle 1000 and proceeds to action box 1002, where the DONE line 459 is set to false. Processing proceeds to action box 1004 where the input for address decoder 444 is selected from the addresses RADDR 446 and WADDR 448 from hardware assist controller 500. Processing proceeds to action box 1006 where bus enable 455 is disabled to isolate data bus 441 from microprocessor 86. Processing proceeds to action box 1008, where automatic holdoff monitoring is enabled. When automatic holdoff monitoring is enabled, it follows the processing described in the flowchart of FIG. 14, described below. Processing then proceeds to read the hardware assist exit state register in action box 1010. Microprocessor 86 will have set the exit state via an interrupt lead or mode pin when it wishes the hardware assist engine to return control to the microprocessor. A determination is then made in decision diamond 1012 whether the exit state interrupt has been asserted.

If in decision diamond 1012 the exit state was asserted, then, in action box 1014, the input for address decoder 444 is selected from microprocessor 86. Processing proceeds to action box 1016, where bus enable 455 is enabled to allow microprocessor 86 access to the peripheral data bus 441. The auto holdoff monitoring function is then disabled in action box 1018 and holdoff line 510 is set to false. DONE line 459 is then set to "true" in action box 1020 and processing returns to the normal mode through circle 700 back to FIG. 7.

If, in decision diamond 1012 the exit state has not been asserted, then processing proceeds to action box 1022, where the receive buffer status register 403 is read to determine if a packet is available. Receive buffer status is read by setting RADDR 446 to receive buffer status register 403 and setting WADDR 448 to receive status information register 502, and clocking the data bus to transfer one word. Hardware assist controller 500 then examines the status in receive status information register 502 to determine if a packet is available. Processing proceeds to action box 1024, where the receive interface status register 423 is read to determine if a packet is available. Receive interface status is read by examining status monitor line 466. Finally, in action box 1026, microprocessor transmit FIFO status register is read to determine if a packet is available. Microprocessor transmit FIFO status is read by setting RADDR 446 to the packet interface peripheral status register 477, setting WADDR to receive status information register 502 and clocking the data bus to transfer one word. Hardware assist controller 500 then examines the status in receive status information register 502 to determine if a packet is available. If, in decision diamond 1028, no packet is available, then processing loops to read the exit state in action box 1010. If a packet is available, as determined in decision diamond 1028, then processing proceeds to action box 1030, where a determination is made which packet to transmit and the packet source is set accordingly. If multiple packets were available, only one is selected. In this exemplary embodiment, this determination is based on prioritizing the various packet sources. Processing then continues through connector B to FIG. 11.

Figure 11:
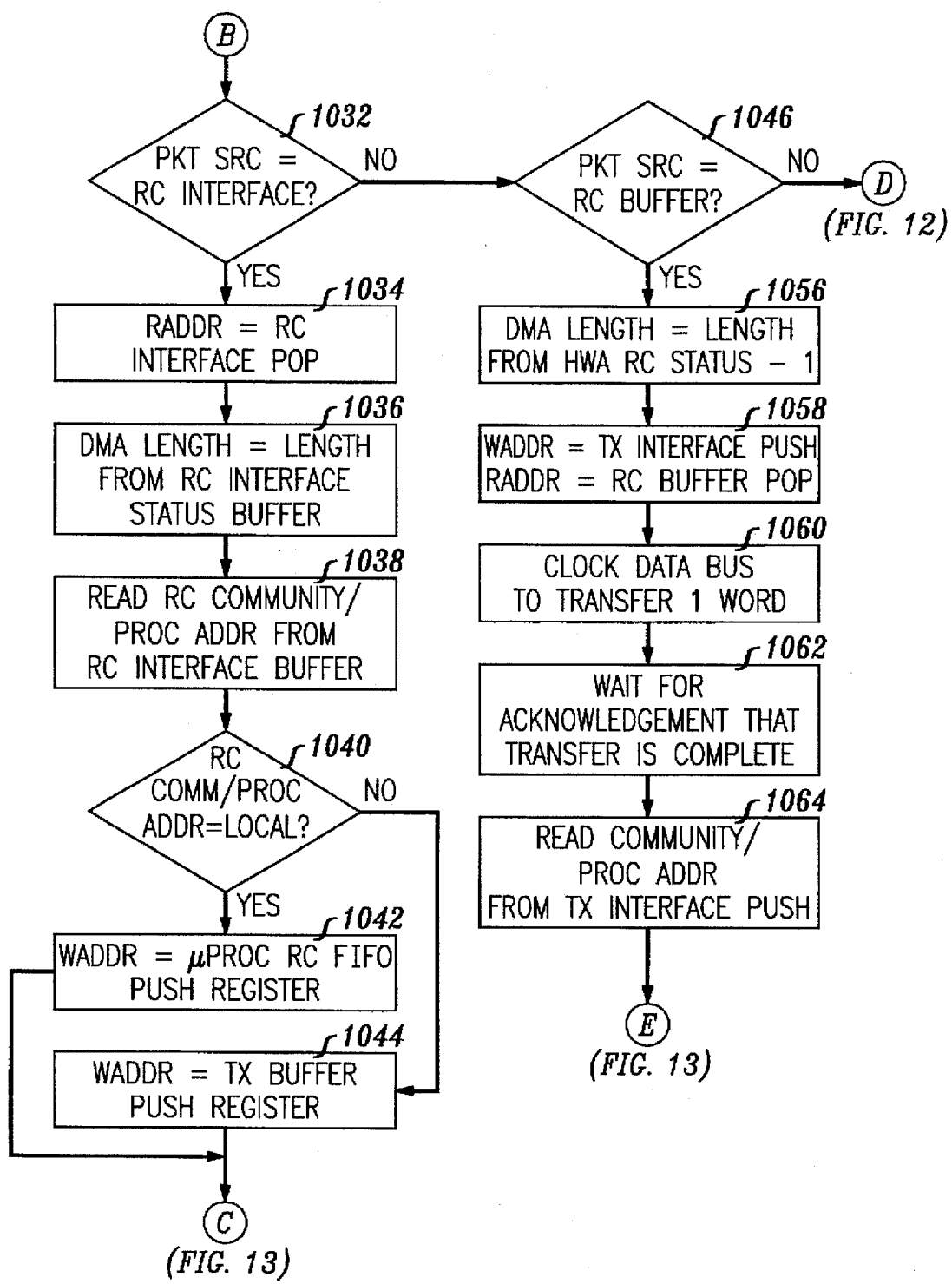

Turning now to FIG. 11, processing continues through connector B to decision diamond 1032, where a determination is made if the packet source is the receive interface buffer 98. If it is, then processing proceeds to action box 1034, where RADDR 446 is set to receive interface pop register 422. Processing then sets the DMA length to the packet length from the monitored receive status 466 in action box 1036. The receive community/processor address (packet address on packet bus 61) is next read from the receive interface buffer via monitor line 468 in action box 1038. Processing then proceeds to decision diamond 1040, where a determination is made whether the receive community processor address is local, meaning that the packet is for microprocessor 86. If it is, then processing proceeds to box 1042, where WADDR 448 is set to the microprocessor receive FIFO push register 474. If, in decision diamond 1040, the address is not local, then processing proceeds to action box 1044, where WADDR 448 is set to the transmit buffer push register 412. Processing from both action boxes 1042 and 1044 continues through connector C, to FIG. 13.

If, in decision diamond 1032, the DMA source is not the receive interface buffer, processing continues to decision diamond 1046, where a determination is made whether the DMA source is the receive buffer 81. If it is, then processing proceeds to action box 1056, where the DMA length is set equal to the length from hardware assist status register 502 minus 1. In action box 1058, WADDR 448 is set to the transmit interface push register 432 and the RADDR 446 is set to the receive buffer pop register 402. The data bus is then clocked in action box 1060 to transfer one word, which is the first word of the packet data containing the community and processor address. In action box 1062, processing waits for an acknowledgment that the transfer is complete, and then, in box 1064, reads the community/processor address from the transmit interface push register 432, via monitor line 464. Processing then continues through connector E to FIG.

13. If, in decision diamond 1046, the DMA source is not receive buffer 81, then processing continues through connector D to FIG. 12.

Figure 12:
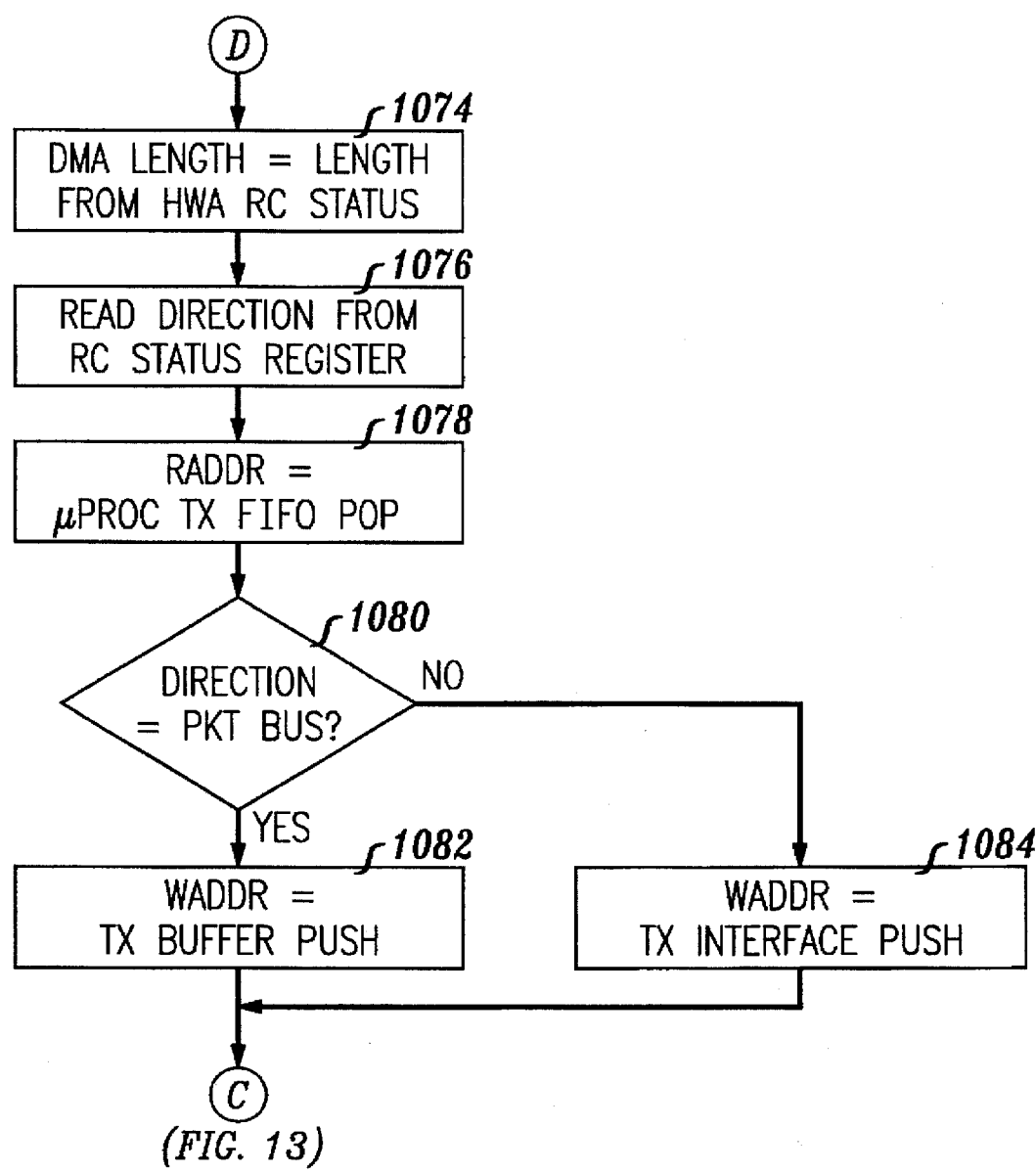

Turning now to FIG. 12, further processing is shown. Processing enters through connector D and proceeds to action box 1074, where the DMA length is set equal to the length from hardware assist receive status register 502 minus 1. In action box 1076, the direction is read from hardware assist receive status register 502. The direction indicates whether the packet in the microprocessor transmit FIFO is destined for the packet bus or for the interface. Processing continues to action box 1078 where RADDR 446 is set to the microprocessor transmit FIFO pop register 471.

Processing continues to decision diamond 1080, where a determination is made if the direction is for the packet bus. If it is, then WADDR 448 is set to transmit buffer push register 402 in action box 1082. If, in decision diamond, 1080, the direction was not toward the packet bus, then the direction is toward the interface and processing continues to action box 1084 where WADDR 448 is set to the interface transmit push register 432. Processing continues from action boxes 1082 and 1084 through connector C to FIG. 13.

Figure 13:
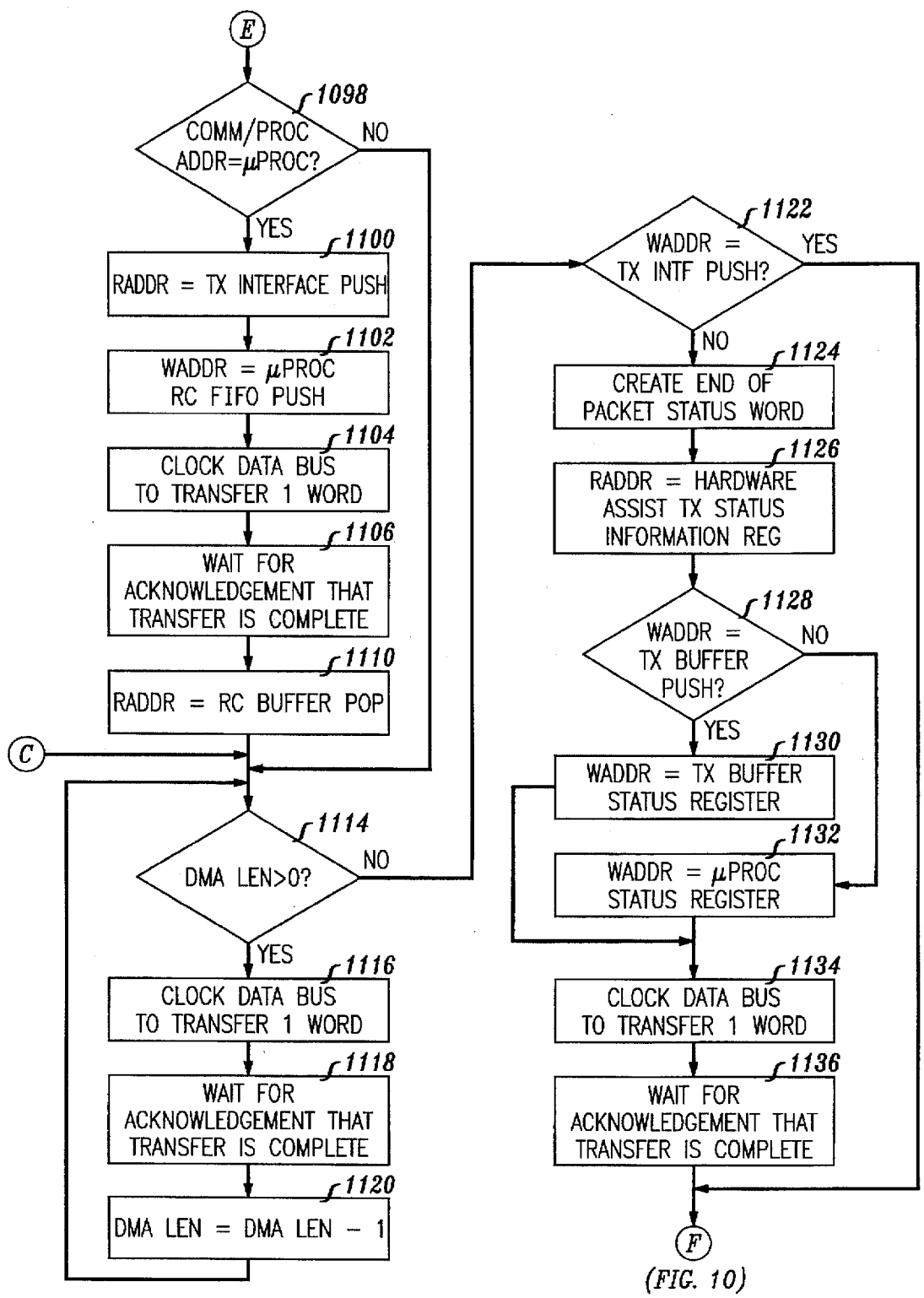

Turning now to FIG. 13, processing from connectors E and C are shown. First, processing enters from connector E and proceeds to decision diamond 1098, where a determination is made if the community/processor address is microprocessor 86. If it is not, WADDR 448 and RADDR 446 are set up correctly to transfer the remainder of the packet and processing is treated as if it entered through connector C, which is discussed below. If the community processor address is local, then processing continues to action box 1100, where RADDR 446 is set to the transmit interface push register 432, which contains the first word of the packet that was previously transferred here. WADDR 448 is set to the microprocessor receive FIFO push register 474 in box 1102, and the data bus is clocked to transfer one word in box 1104. Processing waits for the acknowledgment that the transfer is complete in box 1106. This transfer moved the first word of the packet that was previously transferred to the transmit interface push register 432 into the correct destination of the microprocessor receive FIFO push register 474. In action box 1110, RADDR 446 is set to the receive buffer pop register. Processing then continues as if it came through connector C.

Processing enters from connector C and proceeds to decision diamond 1114, where a determination is made if the remaining DMA length is greater than zero. If the DMA length is greater than zero, then there is more data to transfer and processing proceeds to action box 1116, where the data bus is clocked to transfer one word. Processing then waits in action box 1118 for acknowledgment the transfer is complete, and then the DMA length is decremented by one in action box 1120. Processing then loops back to decision diamond 1114.

If, in decision diamond 1114, the transfer is complete, then processing proceeds to decision diamond 1122 where a determination is made if the write address WADDR 448 is equal to transmit interface push register 432. If it is, then no frame information word or end of packet identifier needs to be written to the transmit interface 92, the entire packet transfer is complete, and processing proceeds to connector F back to FIG. 10 (and then action box 1010). If, in decision diamond 1122, the WADDR 448 was not equal to the transmit interface push register 432, then the packet is written to either the packet bus transmit buffer 82 or to the microprocessor receive FIFO 475. In either case, a final frame information word or end of packet identifier must be written and processing proceeds to action box 1124. In action box 1124 this end of packet identifier or frame information word is created in the hardware assist transmit status information register 504. According to an exemplary embodiment, this frame information word also contains the length of the packet just transferred. Processing proceeds to action box 1126 where RADDR 446 is set to the hardware assist transmit status information register 504, then to decision diamond 1128, where a determination is made whether WADDR 448 is set to the transmit buffer push register 412. If it its, then processing proceeds to action box 1130, where WADDR 448 is set to the transmit buffer status register 413. If, in action box 1130, WADDR 448 is not set to the transmit buffer push register 412, then processing proceeds to action box 1132, where WADDR 448 is set to the microprocessor status register 477. Processing proceeds from both action box 1130 and action box 1132 to action box 1134. In action box 1134, the data bus is clocked to transfer one word (the frame information word). Processing waits for the acknowledgment that the transfer is complete in box 1136. Processing then proceeds through connector F back to FIG. 10 (and then action box 1010).

Figure 14:
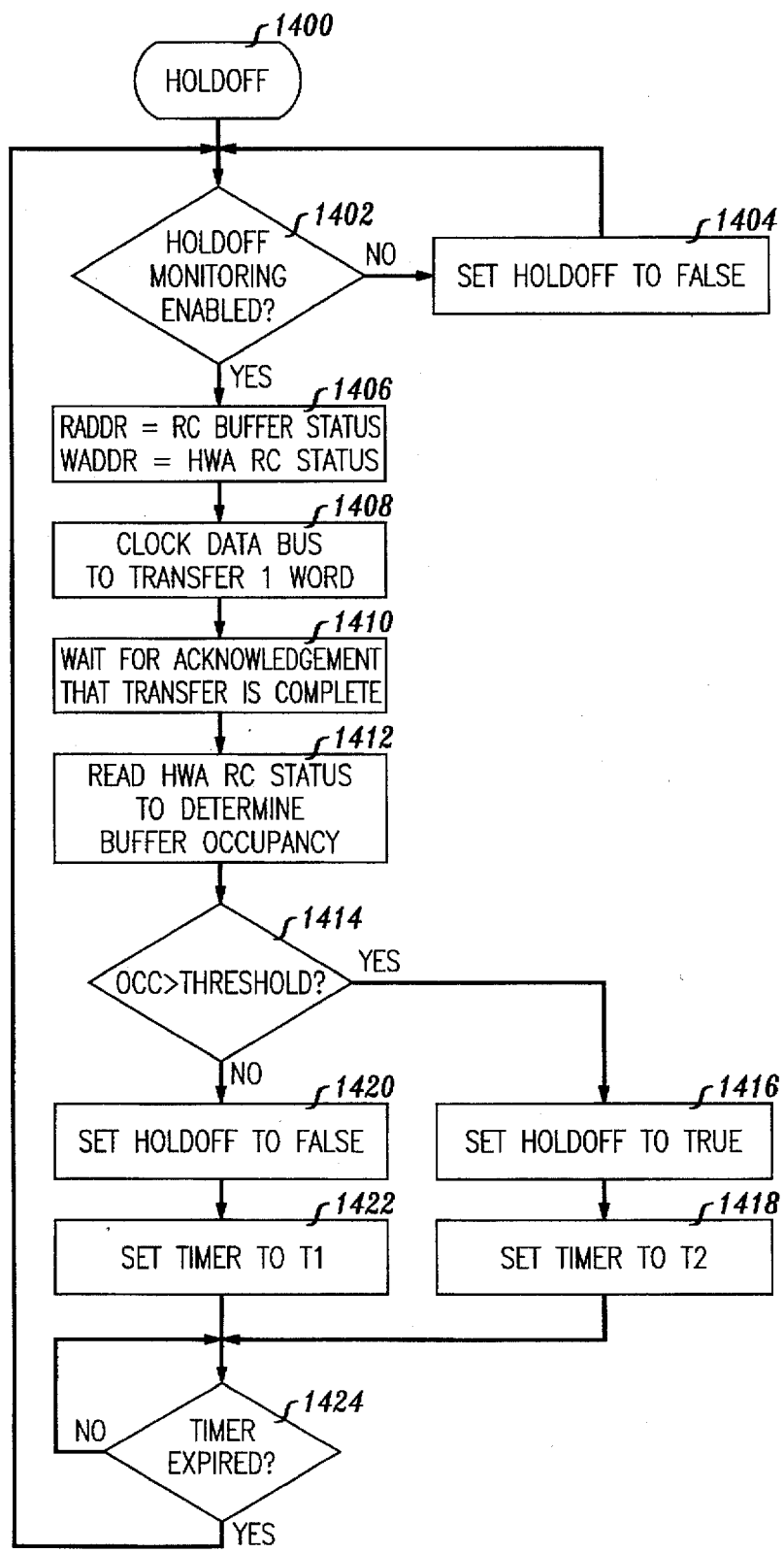

Turning now to FIG. 14, processing for holdoff is shown. Holdoff processing is a separate flow chart and state machine from the hardware assist engine flowcharts in FIGS. 7–13. Holdoff processing in FIG. 14 is executed simultaneously with hardware assist engine processing in FIG. 7–13. Processing begins in circle 1400 and proceeds to decision diamond 1402, where a determination is made if holdoff monitor is enabled. If it is not, then processing proceeds to action box 1404, where the holdoff line 510 is set to false and processing continues back to decision diamond 1402.

If in decision diamond 1402 holdoff monitoring is enabled, then processing proceeds to action box 1406 where RADDR 446 is set to receive buffer status register 403 and WADDR 448 is set to hardware assist engine receive status register 502. Processing proceeds to action box 1408, where the data bus is clocked to transfer one word. Processing then waits in action box 1410 for acknowledgment that the transfer is complete. Then processing proceeds to action box 1412, where the hardware assist engine receive buffer status register 502 is read to determine buffer occupancy. Processing proceeds to decision diamond 1414, where a determination is made if the buffer occupancy is greater than a threshold. If it is, then processing proceeds to action box 1416, where holdoff 510 is set to true and then a timer is set to a predetermined time T2 in action box 1418. Processing then proceeds to decision diamond 1424.

If in decision diamond 1414 the occupancy is less than or equal to the threshold, then processing proceeds to action box 1420, where holdoff 510 is set to false, and then processing proceeds to action box 1422, where the timer is set to a predetermined time T1. Processing proceeds (from both box 1418 and 1422) to decision diamond 1424, where a determination is made if the timer has expired. If the timer has not expired, then processing waits at decision diamond 1424 until it has. Once the timer has expired, processing returns to decision diamond 1402.

It is to be understood that the above-described embodiment is merely an illustrative principle of the invention and that many variations may be devised by those skilled in the art without departing from the scope of the invention. Other types of networks besides packet switches may use this embodiment of this invention without departing from this invention. For example, applicants' invention will work on a local area network, regardless of the network's priority scheme. It is, therefore, intended that such variations be included within the scope of the claims.

We claim:

1. A gateway apparatus for connecting packet networks, said packet networks communicating with each other via packets transmitted through said gateway, said gateway comprising:

a receive buffer for receiving packets from one of said packet networks;

a transmit interface for transmitting said packets to another of said packet networks;

a microprocessor connected to said receive buffer and to said transmit interface, said microprocessor including means for transferring packets from said receive buffer to said transmit interface, and from a receive interface to a transmit buffer; and a hardware assist means connected to said transmit interface and said receive buffer;

said microprocessor includes means for giving up control of said gateway to said hardware assist means, and said hardware assist means including means for detecting packets at said receive buffer, and means for transferring said detected packet to said transmit interface without transferring said packet data through said microprocessor.

2. A gateway according to claim 1 wherein said hardware assist means further comprises:

means for determining a destination address of detected packets at said receive buffer, means for causing detected packets addressed for said another of said packet networks to be transferred to said transmit interface, and means for causing detected packets addressed for said microprocessor to be transferred to said microprocessor.

3. A gateway according to claim 1 wherein said hardware assist means further includes length detection means for detecting the length of detected packets, wherein said means for transferring said detected packets transfers data of said detected packets equal to said detected length.

4. A gateway according to claim 1 further including a transmit buffer for transmitting packets on said one of said packet networks; and a receive interface for receiving packets from said another of said packet networks;

wherein said hardware assist means further includes means for detecting packets at said receive interface and means for transferring detected packets from said receive interface to said transmit buffer.

5. A gateway according to claim 4 wherein said microprocessor and said hardware assist means include means for setting up a direct transfer of a packet from said receive buffer to said transmit interface, and from said receive interface to said transmit buffer.

6. A gateway according to claim 1 wherein said transmit interface comprises an asynchronous transfer mode network interface.

7. A gateway according to claim 4 wherein said receive interface comprises an asynchronous transfer mode network interface.

8. A gateway according to claim 1 further including holdoff means for preventing said receive buffer from overflowing.

9. A gateway according to claim 8 wherein said holdoff means comprises means for determining occupancy in said receive buffer;

means for comparing said receive buffer occupancy with a threshold; and means for throttling input to said receive buffer when said receive buffer occupancy exceeds said threshold.

10. A gateway according to claim 9 wherein said hardware assist means includes said occupancy determining means, said comparing means and said throttling means, and wherein said occupancy determining means, said comparing means and said throttling means operate without transferring said occupancy data through a microprocessor.

11. A gateway according to claim 1 wherein said hardware assist means includes means for calculating a header for said detected packet and means for causing said header to be inserted on said detected packet at said transmit interface.

12. A gateway according to claim 1 wherein said hardware assist means includes means for calculating a header for said detected packet at said receive buffer and means for inserting said header on said detected packet at said transmit interface.

13. A gateway according to claim 2 wherein said gateway further includes error detect means connected to said hardware assist means, wherein said hardware assist means includes means for giving up control to said microprocessor responsive to said error detect means detecting an error.

14. A gateway according to claim 4 wherein said gateway further includes a receive FIFO connected to said receive interface and said receive buffer, said microprocessor being configured to read packets from said receive FIFO, wherein said hardware assist means is configured to determine a packet destination of packets at said receive buffer and said receive interface and said hardware assist means transfers a packet with a destination address matching said microprocessor from said receive buffer or said receive interface to said receive FIFO.

15. A gateway according to claim 4 wherein said gateway further includes a transmit FIFO connected to said transmit interface and said transmit buffer, said microprocessor being configured to write packets to said transmit FIFO and wherein said hardware assist means is configured to determine a destination address on packets in said transmit FIFO and deliver them to said transmit interface and said transmit buffer responsive to said destination.

16. A method for use in a gateway connecting packet networks, said packet networks communicating with each other via packets transmitted through said gateway, said gateway comprising a receive buffer for receiving packets from one of said packet networks, a transmit interface for transmitting said packets to another of said packet networks, a microprocessor for controlling said gateway, and a hardware assist engine, said method comprising the steps of:

said microprocessor turning control of said gateway over to said hardware assist engine;

said hardware assist engine detecting the presence of a packet at said receive buffer; and said hardware assist engine transferring said packet from said receive buffer to said transmit interface without the packet data passing through said microprocessor.

17. A method according to claim 16 further comprising the steps of:

said hardware assist engine detecting whether said packet is for said another network or for said microprocessor;

responsive to determining that said packet is for said another network, said hardware assist engine transferring said packet from said receive buffer to said transmit interface; and responsive to determining that said packet is for said microprocessor, said hardware assist engine transferring said packet from said receive buffer to said microprocessor.

18. A method according to claim 16 wherein said gateway further comprises a transmit buffer for transmitting packets on said one of said packet networks and a receive interface for receiving packets from said another of said packet networks, said method further comprising the steps of:

said hardware assist engine detecting the presence of a packet at said receive interface;

responsive to determining that said packet is for said one network, said hardware assist engine transferring said packet from said receive interface to said transmit buffer; and responsive to determining that said packet is for said microprocessor, said hardware assist engine transferring said packet from said receive interface to said microprocessor.

19. A method according to claim 16 further including the step of said microprocessor transferring packets from said receive buffer to said transmit interface prior to said step of turning over control of said gateway to said hardware assist engine.

20. A method according to claim 16 further including the step of said microprocessor and said hardware assist engine cooperating to perform a direct transfer of a packet from said receive buffer to said transmit interface.

21. A method according to claim 16 wherein said gateway further includes a holdoff circuit for preventing said receive buffer from overflowing, said method further including the step of causing said holdoff circuit to prevent said receive buffer from overflowing in response to said gateway determining that said receive buffer contains a predetermined number of packets.

22. A method according to claim 18 further including the step of said hardware assist engine calculating a destination address for said packet before it is put into said transmit interface.

23. A method according to claim 18 further including the step of said hardware assist engine calculating a destination address for said packet before transferring said packet to said transmit buffer.

24. A method according to claim 18 wherein said hardware assist engine includes an error detector for detecting errors in packets, said method including the step of said hardware assist engine giving control of said gateway to said microprocessor responsive to said error detector detecting an error.

* * * * *